(12) United States Patent
Wagner

(10) Patent No.: US 6,172,753 B1
(45) Date of Patent: Jan. 9, 2001

(54) MOVEMENT AND POSITION MEASURING DEVICE AND METHOD

(76) Inventor: Jean-Jacques Wagner, Schonbuhl 458, Eschen (LI), 9492

( * ) Notice: Under 35 U.S.C. 154(b), the term of this patent shall be extended for 0 days.

(21) Appl. No.: 08/809,068

(22) PCT Filed: Sep. 15, 1995

(86) PCT No.: PCT/EP95/03643

§ 371 Date: Mar. 14, 1997

§ 102(e) Date: Mar. 14, 1997

(87) PCT Pub. No.: WO96/08693

PCT Pub. Date: Mar. 21, 1996

(30) Foreign Application Priority Data

Sep. 15, 1994 (CH) .................................................. 2805/94
Apr. 10, 1995 (CH) .................................................. 1018/95
Aug. 28, 1995 (CH) .................................................. 2448/95

(51) Int. Cl.[7] .................................................. G01B 11/14
(52) U.S. Cl. .............................. 356/375; 356/373; 33/707
(58) Field of Search .................................. 356/373, 374, 356/375; 250/237 G; 33/707, 706, 771

(56) References Cited

U.S. PATENT DOCUMENTS

| 4,732,599 | * | 3/1988 | Bennion | 65/30.13 |
| 4,926,566 | * | 5/1990 | McMurtry et al. | 33/771 |
| 4,974,962 | * | 12/1990 | Stephens et al. | 356/356 |
| 5,251,012 | * | 10/1993 | Riegger et al. | 356/374 |
| 5,424,553 | * | 6/1995 | Morton | 250/548 |
| 5,543,918 | * | 8/1996 | Abraham et al. | 356/376 |
| 5,689,340 | * | 11/1997 | Young | 356/373 |

* cited by examiner

Primary Examiner—Hoa Q. Pham
(74) Attorney, Agent, or Firm—Helfgott & Karas, PC.

(57) ABSTRACT

A method and a device for detecting a position of a graduation support relative to a support of the device in a direction of displacement of the graduation support and the support relative to each other. The device has a light source. The support has a high resolution graduation consisting of a sequence or array of optical elements focusing the light beam sensing plane on a support on which light-sensitive sensing elements are arranged so that the displacement of the graduation support in relation to the sensing plane can be assessed with precision. The light flux is modified by the graduation and intercepts at least the entire width of an optical element such that the light energy is converted into an alternating signal representing the position of the graduation support in relation to the support. The device is suitable for producing high resolution sensors with simple elements which are easy to manufacture.

48 Claims, 17 Drawing Sheets

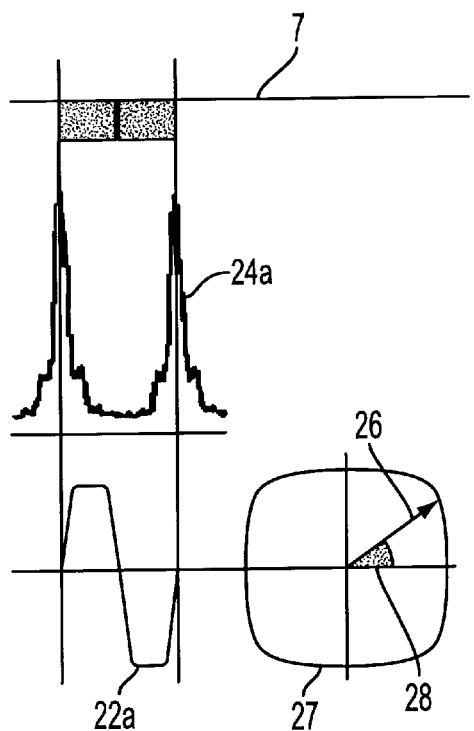
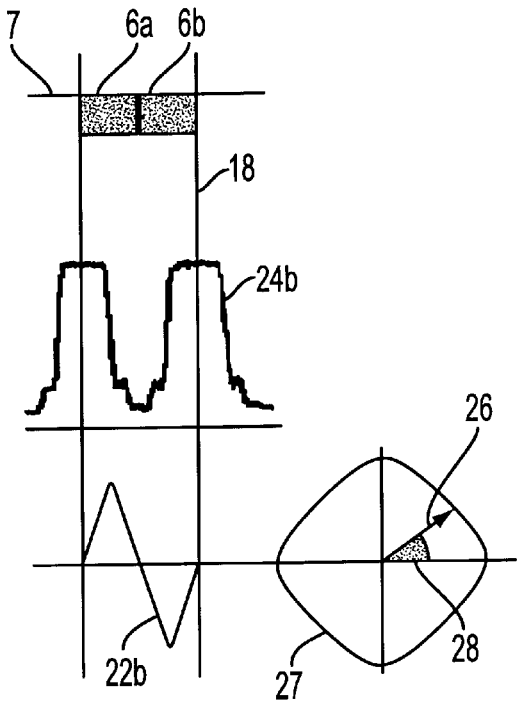
FIG. 2A FIG. 2B
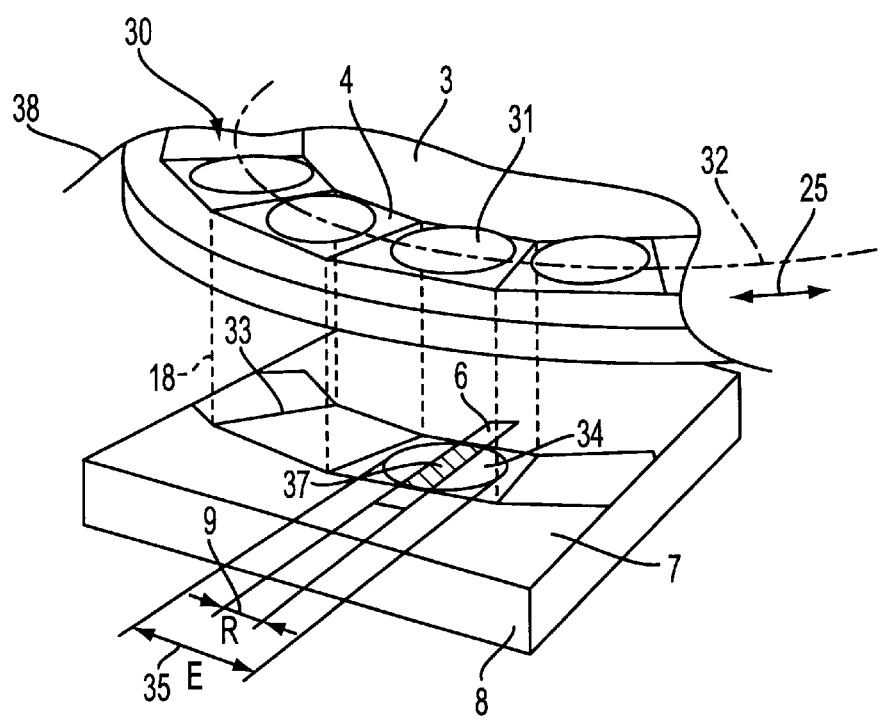
FIG. 3

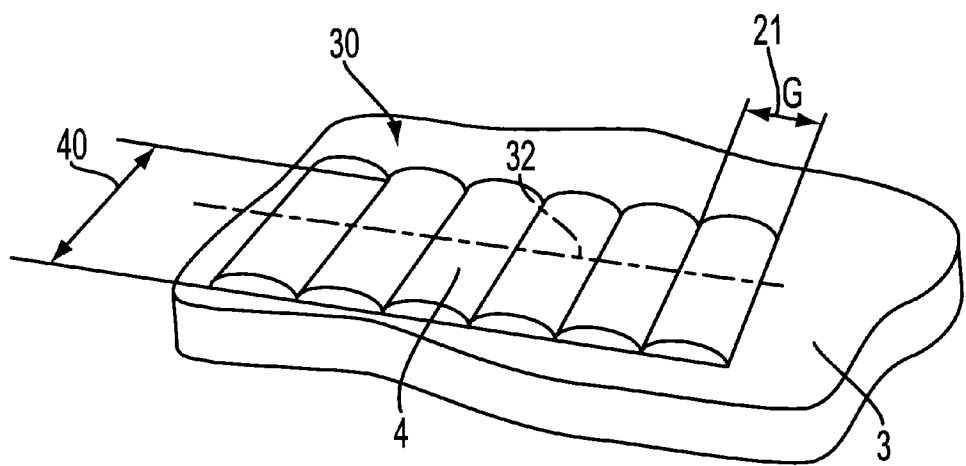
FIG. 5
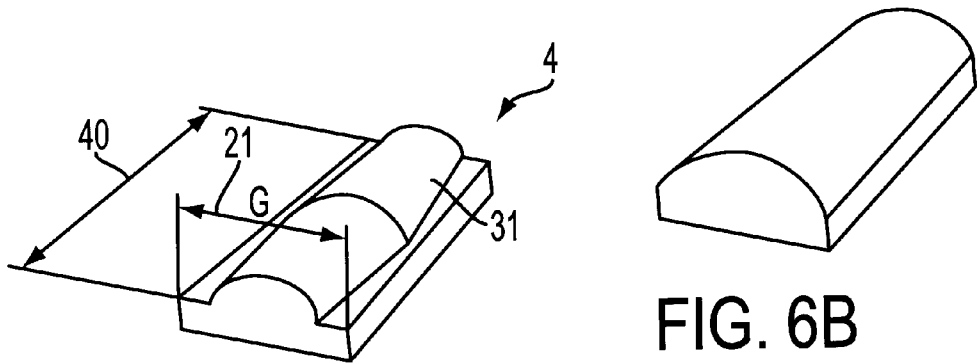
FIG. 6A
FIG. 6B
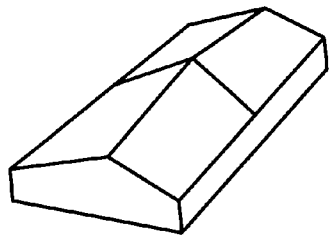
FIG. 6C
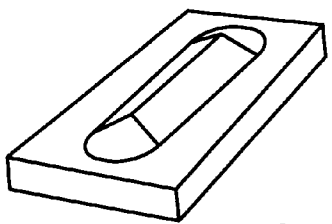
FIG. 6D

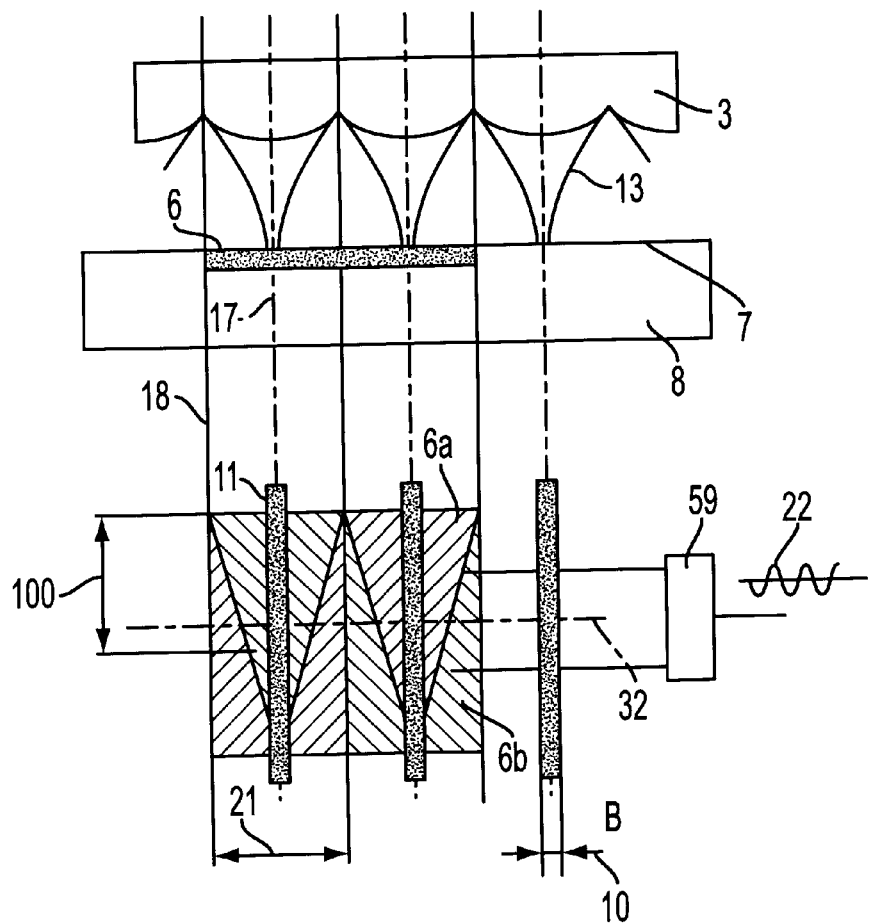
FIG. 10A
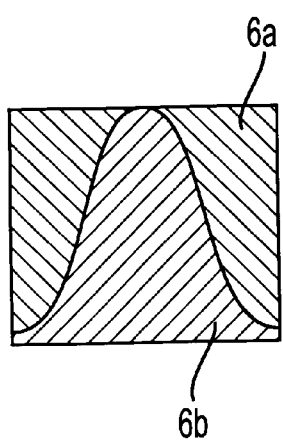
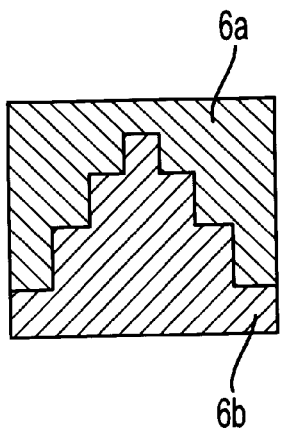
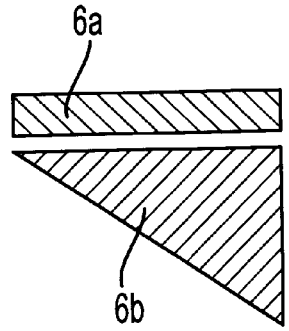
FIG. 10B    FIG. 10C    FIG. 10D

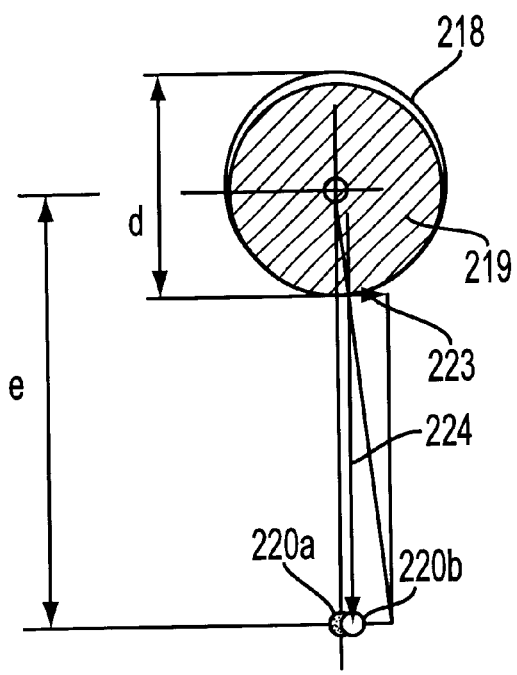
FIG. 20
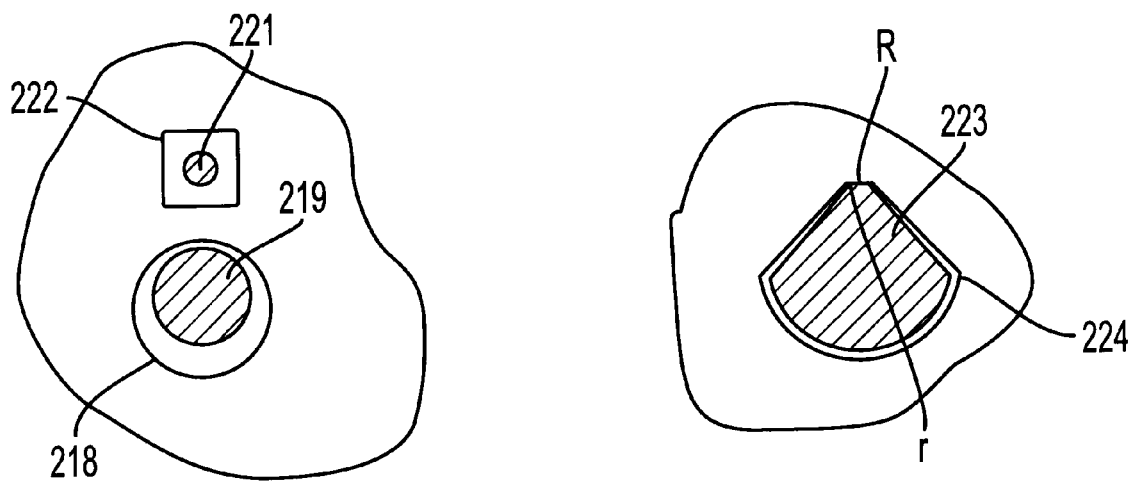
FIG. 21A
FIG. 21B

MOVEMENT AND POSITION MEASURING DEVICE AND METHOD

BACKGROUND OF THE INVENTION

The invention relates to a method and/or device to detect with the aid of a light beam the relative or absolute position on the displacement axis of a graduation support in relation to a support belonging to a device, which includes:

- a light source producing a light flux,
- a graduation support having a graduation placed in the light flux which it modifies,
- a support containing one or several sensitive elements capable of intercepting the modified light flux,
- one or several sensitive elements which convert the intercepted light intensity into a physical effect,
- and a detection circuit suited to produce a useful electric circuit for the design of movement and position sensors.

EP Patent application 474 149 A2 (Kawamura) describes such a device in the form of an incremental encoder. The working principle is characterised by the fact that the graduation is made out of a transparent half-division and a focusing half-division to which two sensitive diodes correspond to the light of a width equivalent to a half-division. The level of resolution reached by the device is not quantified.

The dimension of the light spot is defined as infinitely small and the non-illuminated zone as dark. This point of view holds as long as the optics are perfect and the effect of diffraction are not apparent.

The working of the device depends on, among other things, the dimension of the light spot projected by the focusing part on the detection diodes. For example, for a lens of 20 $\mu$m and a focal distance of 80 $\mu$m which corresponds to the dimension of 40 $\mu$m of a division, the width of the light spot corresponds to 30% of the width of the sensitive element. The current curves described in the Kawamura's patent are no longer usable, in particular the resolution can not be multiplied as specified.

The unit resolution of the device corresponds to an alternation of the digital signal for a division length. The sensor's resolution is defined as the graduation's resolution.

The unit resolution corresponds to the resolution defined by the geometric and physical layout of the sensitive elements. The graduation resolution corresponds to the resolution defined by the dimension of a graduation's division.

Another disadvantage of this device lies in the fact that the form of the position signal is not in tune with current technology which is an handicap to the product's commercialization.

Furthermore, the Kawamura disclosure doesn't report the constraints relative to the creation of the light source. It also doesn't mention preferential forms of the lens for improving the device's resolution.

Patent EP 0206 656 (Leonard) describes a device which works with a graduation made of elements having a first half-portion to let the light pass through and a second half-portion to retain the light. A miniaturisation of the graduation support is limited, either for mechanical construction considerations or for the high costs related to the making of a glass graduation using lithographic techniques.

Patent EP 0489399 A2 (Igaki) uses a series of optical elements arranged on a cylinder and a light flux crossing the same graduation twice. On the first crossing, half of the light flux is reflected and the other half is modified by grating effect and projected on the opposite side of the graduation where the light flux is divided in three directions. The possible resolution depends on the wavelength and the graduation-support diameter defined by the formula:

$$(N-\tfrac{1}{4})*(\text{graduation pitch})*(\text{graduation pitch})/(\text{wavelength}) < \text{graduation diameter} < (N+\tfrac{1}{4})*(\text{graduation pitch})*(\text{graduation pitch})/(\text{wavelength})$$

This means that 15 mm diameter corresponds to a resolution of approximately 760 divisions. The commercial product claims a resolution of approximately 80'000 divisions which requires a complex circuit detector for the treatment of the signals generated by three receiver diodes. The design of the graduation support as a cylindrical graduation only doesn't allow, for example, to design a level sensor.

The U.S. Pat. No. 4,531,300 shows an example of a level-measurement device which uses an identical technique to that of Leonard. This device is particularly cumbersome and too costly to compete with the standard bubble-sensor products. The use of capacitors or magnetic-resistant sensors requires an analog/digital circuit converter of higher than 12-bit resolution which is more difficult to conceive than a purely-digital circuit.

Patent PCT/EP 93/02415 describes a kilometer measurement system requiring a sensor for the measurement of the movement dynamics of a vehicle. The use of a gravitational sensor is favorable for its stable functioning over time and its simplicity of use. The values to be measured require a high-resolution sensor which is not available on the market.

With the devices described above it is not possible to conceive small-sized absolute sensors based on a linear-code reading as described in the patent JP 3-6423 (15). There is also not possible to conceive high-resolution gravitational sensors that certain market applications require.

SUMMARY OF THE INVENTION

It is an object of the present invention to apply a new method and device which allow the state-of-the-art deficiencies to be circumvented in order to considerably improve the performance, in particular the resolution, of the function related to the incremental or absolute measurement of a displacement.

Other objects of the invention are the improvement of the electrical characteristics of this type of device, in particular the current consumption and reduction of production costs.

The above objects of the invention are attained by a method and device for detecting one of the relative and absolute position on a displacement axis of a graduation support of the device with the aid of a light beam, which device comprises a light source producing a light flux, a graduation support including a graduation placed in the light flux which it modifies, a support containing at least one light sensitive element capable of intercepting the modified light flux, said at least one light sensitive element converting the intercepted light intensity into a physical effect, and a detection circuit suited to produce a useful electric signal, the graduation support containing at least one graduation made of at least one of several series of optical elements, said optical elements containing at least one focusing portion which focuses the light flux on the support containing the light sensitive elements and which produces several light spots. The light spots may be in one of an oblong and rectangular shape and may be arranged perpendicularly to a median line of the graduation. During a relative displacement between the graduation support and the support a distance equal to a length of a division, the maximum overlapping of light energy by at least one of said light spots belonging to the same optical element of said at least one of said light sensitive elements corresponds to a portion of one of the minimal and maximal value of an alternating signal corresponding to a division and convertible to one of a digital signal and a position signal.

The method and device of the present invention differ from the method and device described by Kawamura in that the combination of a single light spot with at least one sensitive element is used for the creation of an alternating signal which represents the displacement of the graduation support in relation to the support containing the light sensitive elements. A preferred design of the device includes a graduation made of cylindrical lenses placed side by side. In this case, all of the energy crossing the graduation can be focused on one or several sensitive elements. A preferred layout of the sensitive elements corresponds to a series of elements whose width in regards to the median line is inferior to the length of the division. A higher unit resolution of the one defined by the division of the graduation can be obtained. The detection circuit can be simplified using a high unit resolution.

The invention's advantage gives the possibility of conceiving an optical barrier displacement measurement system working under optimal conditions, this with divisions of large dimension as well as with division which dimension correspond to the function limits of focusing element. The possibility of increasing the unit resolution in relation to the graduation resolution allows the use of each technological aspect in an optimal fashion.

The cylindrical shape of the lens gives the possibility to reduce the light spot width to a minimum and to size the length of the lens to insure the propagation of sufficient light energy. It also gives the possibility to design in a elegant manner a graduation adapted to the designs of absolute measurement devices. The oblong shape of the light spot, which is common to cylindrical lenses, is also well adapted to the design of the device described in FIG. 10a.

The invention gives the possibility to design economical sensors of a very high resolution and/or small dimensions. As a result of the lenses' small dimension and the fact that the light source can be placed very close to the graduation support, it is possible to design sensors of small axial dimension.

The following example of a design gives a better description of the advantages of the invention over standard practice.

Supposing there is a graduation made up of lenses with the width of 16 $\mu$m having a focal distance of 80 $\mu$m which is combined with sensitive elements of the width of 4 $\mu$m and the length of 200 $\mu$m. The width of these elements corresponds to the division length of a 16 $\mu$m. This setup results in 3000 divisions placed on a 15.3 mm diameter. The modulation of the light flux is such that the minimal possible width "M" of the light impact on the plane of the sensitive elements measures approximately 3 $\mu$m. The use of 4 diodes of the width of 4 $\mu$m for one division gives the possibility with a differential evaluation of the current to bring the resolution up to 6000 divisions. A second group of sensitive elements shifted by a division of ¼*¼ give the possibility to produce a signal as a cosine shape. A simple detection circuit can multiply the unit resolution by 4 and bring up the resolution up to 24'000 units. A detection circuit and a mechanical device of good quality open the possibility to multiply the unit resolution by 256 and bring up the resolution to 153,600 divisions. The choice of focal distance of 40 $\mu$m combined with a carefully designed mechanics of the elements being part of the device allows the resolution of the above example to be doubled.

Using the device put forward by Kawamura alike the above example, the division of the graduation should be of 8 $\mu$m, that is, a lens of 4 $\mu$m, which cannot be designed since the focal distance of this element should be between 1 and 2 $\mu$m to generate a light spot which is sufficiently small. Furthermore, the ratio of the current signals generated by the sensitive elements is for a spot infinitely smaller of 8. These two values show that the Kawamura's device does not function at such values of resolution. The Kawamura's device allows a unit resolution to be approximately 10 times smaller than the invention. According to the proof set out in FIGS. 4a–4d, it can be concluded that with an equal unit resolution, a similar light flux, and with ideal working conditions, the present invention can produce an electric signal of a value 8 times higher than the signal produced with the Kawamura's device.

The analysis of the device, according to Leonard, shows that such a device would reach resolution values of 2 to 4 times lower, for a similar quality design to 3 to 4 times lower than the device of the present invention. A graduation of a similar resolution requires a 8 $\mu$m period grating whose production is not economical.

The example cited above shows that the current technology does not give the possibility to reach unit resolutions equal to those of the present invention. The experiments carried out to this day have shown that it will be possible to manufacture graduations, using the invention, of a division length equal to 8 $\mu$m without special techniques.

The graduation can be manufactured by plastic injection moulding which gives the possibility to produce the graduation support in the same operation. The attaching of additional construction elements, for example a mounting aid, can be achieved without a noticeable increase in the production cost.

The layout of the sensitive elements according to the invention gives the possibility to generate with a pair of sensitive elements an alternating signal whose value or shape is independent of the light flux intensity. The sensitive elements can be distributed on several divisions. For an optimal position of the light source or an optimal ratio between the width of the light spot and the width of the sensitive elements a sinusoidal signal can be integrated for a higher resolution of the device. A preferred shape of the optical element is a cylindrical lens.

A graduation may be made of different optical elements, each division being capable of being assigned a numerical value which can define the absolute position of the graduation support. Absolute encoders may be designed with the equal dimensions as those of the sensors described above. This technology, which can be achieved by the use of cylindrical lenses, holds particular advantages for the fabrication of small-sized absolute encoders.

The detection circuit may be integrated with the sensitive elements on the same support which will also be the case, for example, for a 13-bit absolute resolution sensor. The circuit will be small sized and economical.

As a result of the characteristics described above, the present invention provides the possibility to design new products which are simple and function with few elements, which cannot be realized by the prior art technology. Sensors may be produced, which are economical, which have high resolution, which are of small in size, which use little power, which can deliver incremental impulses and/or absolute position values and which will be adapted to the future of micro-electronics in which the trend is toward miniaturisation and energy efficiency.

BRIEF DESCRIPTION OF THE DRAWINGS

The following drawings are used for the explanation of the invention:

FIG. 2 shows an electric signal in relation to the light signal;

FIG. 3 shows a disposition of the elements of the device of FIG. 1;

FIG. 5 is a preferential design for the graduation;

FIGS. 6a–6d shows a focusing portion;

FIGS. 10a-10d show a disposition of the sensitive elements and shapes of a signal generated;

FIG. 20 shows a friction bearing;

FIGS. 21a–21b shows a low-friction bearing.

DETAILED DESCRIPTION OF THE PREFERRED EMBODIMENTS

The light source is the part which consumes the most current, it's therefore advantageous to use this energy in an efficient manner.

A sensitive element which corresponds to an integrated diode in a CMOS technique has an internal capacity which defines the working limit in function to the current emitted by the sensitive element and the current level capable of being used by the detection circuit. This capacity also will define the minimal threshold of the required luminosity and/or the maximum displacement speed of the support in relation to a sensitive element. The capacity value for the diode mainly depends not only on its surface, but also on the technique used for its manufacture.

Focusing the light flux gives the possibility to increase the level of light energy received per unit of surface, to reduce the surface and the interference capacity of the sensitive element.

The use of small-dimensioned optical elements gives also the possibility to reduce the axial dimension of the sensor. An equal ratio between the distance separating the light source from the optical element and the optical element's width corresponds to the same intensity of useful light flux for the detection process.

Using small-dimensioned optical elements gives also the possibility to reduce the dimension of the sensitive elements thus enabling the integration of the detection or reading function onto the same support or chip.

The manufacture of optical or graduation elements can be achieved by electron beam manufacturing. An X-Y table at a nanometer resolution can manufacture high-quality optical elements on the basis of binary data characterising the geometric shape of the optical element.

A point or section of the electron beams is positioned on the part to be treated along the X-Y axis. The Z axis is obtained by modulation of the intensity of the electron flux.

By taking out or modifying the material, this method allows to machine different materials such as polymers, in particular polycarbonate, quartz, and steel which can be used in the manufacturing of plastic tools or other materials. When polymer is used a copy of the original shape will be manufactured by electrolytic deposit of Nickel or other alloys. The obtained part can be for example placed in an injection moulding tool. This process allows the making of variously-shaped graduations such as are described in this document.

Figure 1:
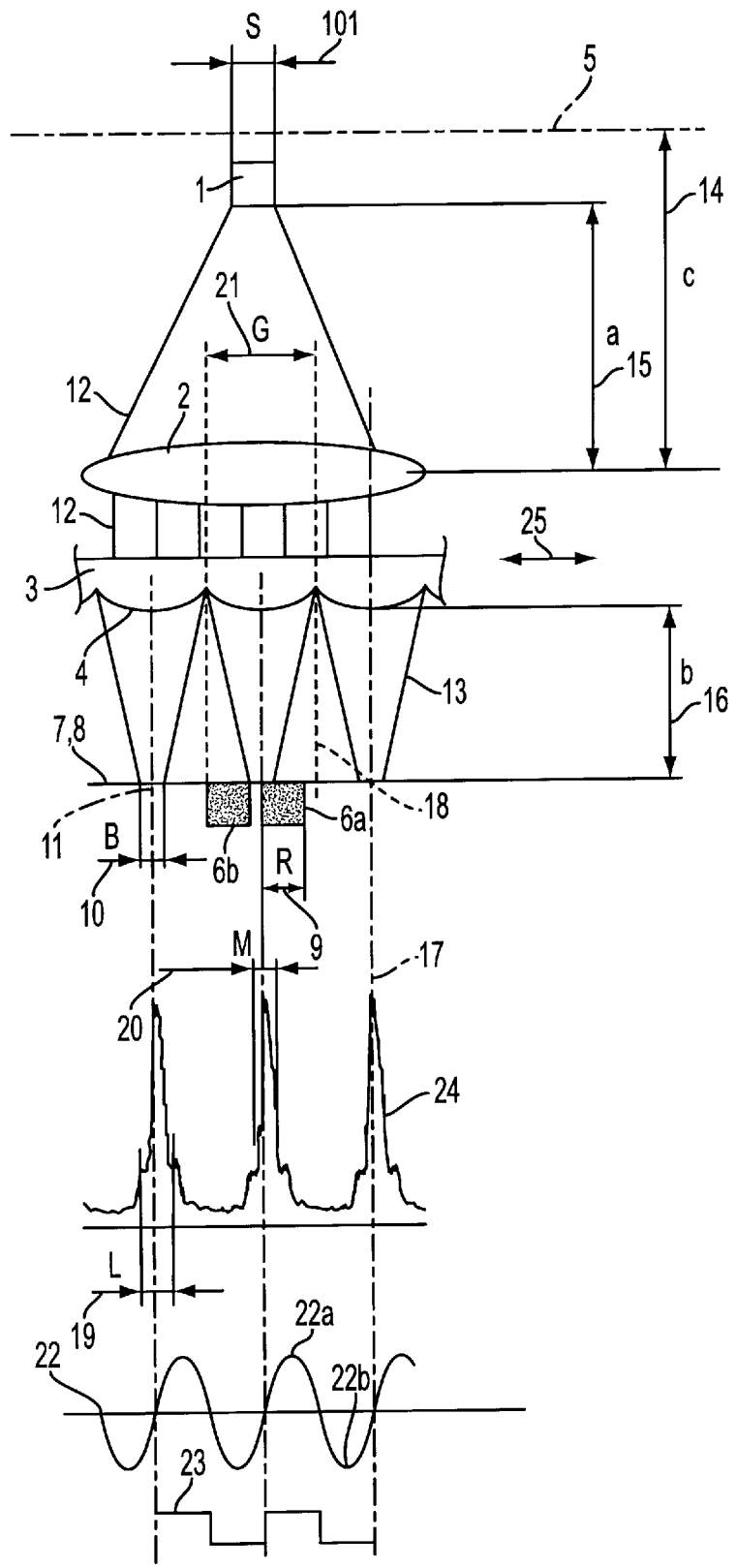
FIG. 1 is a simplified diagram of the measuring device.

Referring now to the drawings in detail, and firstly to FIGS. 1–3, FIG. 1 shows the disposition of different elements being part of the device, which are shown schematically as a section. The device includes a light source 1 of width, dimension or section S 101, a lens or an optical device 2 for a better modulation of the direction of the light flux schematically represented by 13, a section of the graduation support 3 containing a series of cylindrical optical elements 4 of width E 21 containing a focusing portion, which portion may focus the light radiation represented by lines 12 and 13 on the image plane 7 onto a specific point named light spot 11 of dimension B 10. Light-sensitive elements 6 of width or dimension R 9 are part of the support 8. The lines 18 delineate the division. The lines 17 represent the geometric axis of the division which in this case corresponds to the optical axis of the optical elements 4. The graduation support 3 can be displaced horizontally in the direction of arrow 25 in relation to the sensitive elements 6. The dimensions c 14, a 15 and b 16 define the position of the elements in relation to the graduation, and the final plane represented by a dashed line 5, which corresponds to a line beyond which it is no longer possible to reduce the dimension of the image projected onto the image plane 7. The curve 24 represents the distribution of light intensity on the image plane 7. It is characterized by the two dimensions M 20 and L 19. The image of the electric signal obtained by the displacement 25 of the graduation support 3 in relation to support 8 is represented by signal 22, maximum value 22a or minimum value 22b which crosses a reference value at least two times. A central position of the light spot 11 in relation to a sensitive element 6 may correspond to a maximal signal value 22a or a minimal signal value 22b. This signal can be converted into a useful digital and/or analog signal 23. A logical value of the digital signal 23 can corresponds to a position signal.

The light source 1 should preferably be a diode of an elongated shape which is represented here in section. A width of 20 to 200 μm can be representative for the device.

It can correspond to a laser or some other light source which emits in the range of UV, of visible light, of infrared or other. The optical device 2 can make the direction of the light flux crossing the graduation to be parallel. The device can also be conceived without the optical device 2.

The light beam 13 defined by the optical element 4 is focused on the image plane 7 onto one point, represented by a light spot 11. The width B 10 of the light spot 11 is less than the projection of the optical element 4 section on the image plane 7. One or several light spots 11 can correspond to an optical element.

The energy-converting or light sensitive elements 6 can be diodes of type P+/N or of any other type which are compatible with CMOS technology, photo-transistors or other elements which can convert the energy from the light source into current and/or vary the physical characteristics of the sensitive elements. They can be placed on the same geometric plane and be integrated into the same support 8.

A group of sensitive elements is represented by the combination of sensitive elements 6a and 6b or, in the case of FIGS. 9a and 9c, 6a and 6b or 6c and 6d. A group of sensitive elements represents the sensitive elements which can create an alternation of the signal 22. A group of sensitive elements can also include one single sensitive element combined with a reference value which is, for example, generated by the circuit. In this case, the sensitive element will give a half-alternation of the signal 22, from which will be generated a half-alternation of the digital signal 23.

A unit of sensitive elements 56, 57 (FIG. 9) corresponds to one or several groups of sensitive elements allowing the formation of one or several alternations of signal 22. By definition the digital signal 23 coming from a first unit of sensitive elements corresponds to an output or channel "A". A second signal coming from a second unit of sensitive elements producing a preferably identical signal and shifting by ¼ alternation in regards to signal 23 corresponds to an output "B". The subsequent evaluation of channels "A" and "B" enables to detect the direction of the displacement and to increase the unit resolution of the device.

The dimension B10 of the light spot 11, which is very much less than the length 21 of the division, gives the possibility to increase the unit resolution of the device.

The support 8 can represent a chip or a silicon support of an integrated circuit to which the sensitive elements and preferably the detection circuit are integrated. The detection circuit can convert the current emitted by the sensitive elements into signals and/or information usable by other electronic devices. A graduation can correspond to several supports 8.

By definition, the graduation is a series of optical elements including a focusing portion which focuses the light onto an area of the support 8. If an optical,element corresponds to two light spots, by definition, it will be a matter of two graduations which could be merged or two different divisions.

The dimension S,101 is the width of the light source 1. The dimension B, 10 depicts the useful width of the light spot on the image plane 7. The dimension a,15 is the distance between the light source and/or the light object and the optical device 2 which corresponds to preferably the focal distance of the optical device. The dimension c,14 is the distance between the final plane 5 and the optical device 2. The dimension b,16 which can be equal to the focal distance f, represents the distance between the optical elements 4 and the image plane 7. The dimension G,21 is the length of the division or the width of the optical element 4. The dimension R,9 is the width and/or the average width of the sensitive element 6. The dimension L,19 is the first order minimal dimension corresponding to the maximal optical resolution of the focusing part. The dimension M,20 is the useful width of the light signal which corresponds to a maximum relative energy concentration in regards to the rest of the obtained light signal. For example, the light source 1 can be sized in relation to the useful width.

The relation between the width of the light spot 19 and the width of the light source 1 is obtained by the formula S/B=a/b. The minimal width of the light spot corresponds to the formula Lmin=c1*Lambda*b/E, where c1 is a value of 2.22 and corresponds to the second maximum light intensity, where Lambda represents the light's wavelength, where b is the focal distance and E is the width of the focusing element 4. The value of c 14, which is a limiting value, can be expressed by the following formula: c=M/L*S*E/(c1*Lambda). For values where a>c the width L or M will remains constant. For values where a<c, the width of the light spot will vary in function of the relation between the values a and c. Varying the distance a in the a<c domain makes it possible to vary the width M and to act upon the relation R/M and also on the shape of the electric signal 22.

From the statements made above, it can be concluded that the choice of the focal distance of the focusing elements 4 will be the determining factor for a maximal energy output. A small focal distance corresponds to L value or minimal M value. For a given width of the light source 1 and a given width of the sensitive element R, this allows the light source 1 to be moved closer to the graduation support and thus to capture as much light energy coming from the light source as possible. It also follows that it is more advantageous to use the light source 1 working in, for example, blue or green light than in infrared, the critical dimension Lmin being smaller.

The distance between the optical device 2 and the graduation support 3 plays a secondary role. Without the optical device 2, the dimensions 15 and 14 will have the optical or focusing element 4 as their origin and the optical axes will be convergent toward the light source 1. Therefore, there will be a distorted distribution of light spots 11 on the image plane 7.

The image plane 7 can correspond to the focal plane of the optical or focusing elements 4,31. Experience has shown that the optimal image plane is a distance between 1 and 1.2 * the focal distance of the focusing elements.

The image plane 7 can also correspond to a more distant plane with the maximal illumination obtained by the superposing of the effects due to the geometric optic and diffraction optic physical laws.

FIGS. 2a and 2b give the possibility to visualize the importance of the R/M ratio by showing two extreme situations side by side in FIG. 2a where the ratio "R/M>1" and in FIG. 2b where "R/M<1". A pair of sensitive elements 6a and 6b are represented on the image plane 7. They receive a signal of light intensity designated at 24 and generate with the help of a non-represented circuit an electric signal 22. For example, the sensitive element 6a produces a current corresponding to a positive value in function with the received illumination and the sensitive element 6b produces a current of negative-value in function of the received illumination. The difference of the thus generated values, which can also correspond to the difference of the currents emitted by the two sensitive elements, corresponds to a signal value 22 which periodically varies in function of the displacement of the graduation support 3.

By using a second group of sensitive elements shifted by a ¼ division, it will be possible to generate two signals corresponding to a sine and a cosine. The transfer of these two signals on a orthogonal plane allows a vector 26 to be defined whose value will vary in relation to the curve 27 during the displacement of the graduation support in relation to 25. The of the vector is represented by 28.

With the ratio R/M>1, the shape of the curve 27 comes closer to that of a square as shown in FIG. 2a, a diamond-shape for a ratio of R/M<1, and a circle for a ratio of R/M=1 (not shown).

The stable shape of the curve depends on mechanical and geometrical factors of the device as well as the working quality of the receiver diodes. A stable curve gives the possibility to extract the value of the position angle 28 in a more or less regular fashion.

The quality of the shape of curve 27, which in the best case corresponds to a circle, enables to have an electric measurement which corresponds to an exact position measurement. For example, a curve such as is represented in FIG. 2a causes errors in terms of the definition of the geometric position.

These two qualitative points of view will determine the capacity of the real resolution of the measurement system which could be higher than the unit resolution of the device, usually a value of 4 to 256 times higher.

The ratio M/R depends on the ratio a/c being characterised by the shape and dimension of the light source 1. The relation between a and c will be a/c>1. a/c>1 corresponds to the width of an unchanged image and a loss of light energy from the fact that the opening angle of the focusing element is needlessly reduced.

FIG. 3 represents a three-dimensional view of one of the preferred layouts of the device's elements, that is to say a partial representation of the graduation support 3 limited by line 38, a graduation 30 formed by a series of divisions or optical elements 4 aligned on the directrix or median line 32 of the graduation and including a focusing portion 31, an image plane 7 corresponding to the support area 8 containing the sensitive elements 6 of width 9.

The lines 33 represent the perimeter of the projection of the surface of optical elements or of a division on the image plane 7 after the lines 18, the section 34 the projection of the focusing portion 31 of width 35 and the intersection surface 37 the intersection between the surface 34 and the surface of the sensitive element 6 of width 9. The width 35 of the projection of the focusing portion 31 will be greater than the width 9 of the sensitive element 6 so that signal 22 can be conditioned in the desired shape.

The sensitive element 6 can be positioned in a perpendicular manner in regards to the median line 32. It will preferably be of an oblong or mainly rectangular shape which, assuming the same manufacturing technique is used, gives the possibility to increase the level of light energy convertible by a unit of width 9 of the sensitive element 6 and/or to increase the resolution of the device for the same amount of light energy. The width of the sensitive elements can be 2 $\mu$m or more. The total value of the width of each sensitive element belonging to the same division is preferably equal to or less than the value of the length of the division. Another possible design of the sensitive element is shown in Fig 11d.

A principally rectangular shape is understood to be like a surface easily capable of being superimposed on a rectangle or which, in the direction of the width 9, includes at least two sides of any parallel shape or shape that is converging parallel toward the center of the curve of the median line 32 and in the sense of the width of two sides of any shape.

Figure 4A:
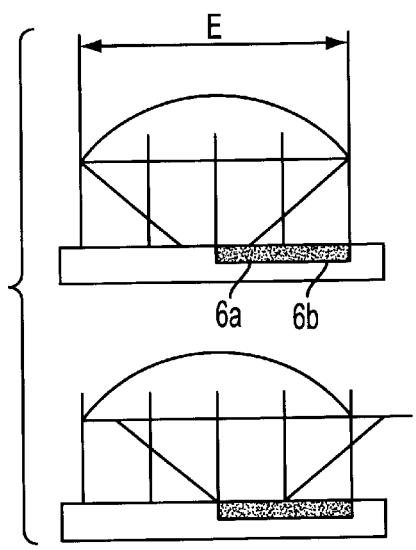
FIGS. 4a–4d show a comparison of the performances between this invention and prior art.
Figure 4B:
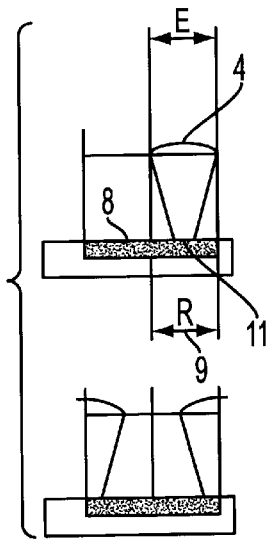
Figure 4C:
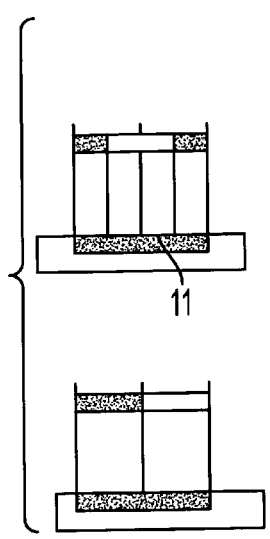

FIGS. 4a–4d show a comparison of techniques of the present technology and of the invention based on the fact that each device has the same unit resolution and that the light flux is identical. This reasoning also holds for spherical or cylindrical-shaped lenses. FIGS. 4a, 4b, and 4c represent the disposition of the graduation support for different technology and two schematic diagrams of the positions of the division 4 laid out at a distance equal to ¼ of the unit division.

FIG. 4a shows the present invention. State-of-the-art technology is shown in FIG. 4b for the Kawamura invention and in FIG. 4c for the Leonard invention. The lens in FIG. 4a covers a surface area equal to four diode widths. A value higher than 4 diodes would also be possible since the dimension of the light spot can easily be reduced up to the value limits which are approximately equal to M=4*lambda*f/E.

Figure 4D:
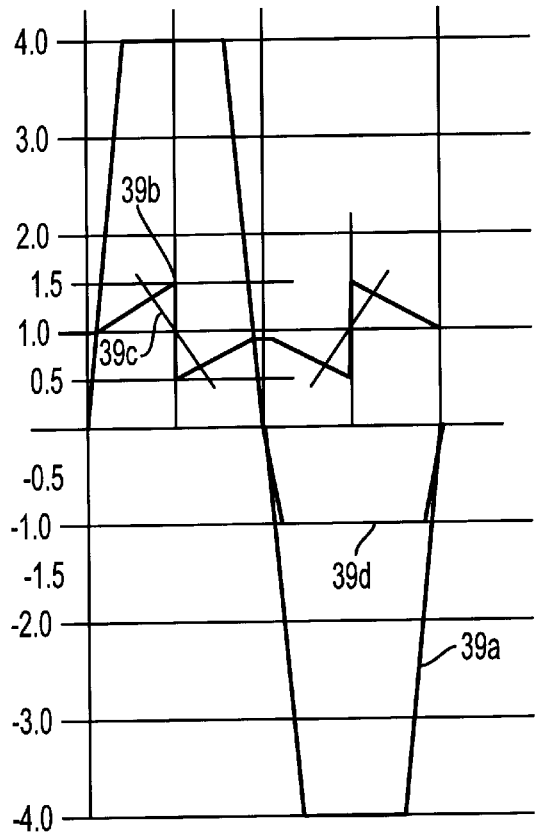

FIG. 4d shows the shape and the intensity value of the current generated by the sensitive element. Curve 39a, here in a trapezoidal shape which is due to the reduced dimension of the light spot, depicts the intensity value for FIG. 4a, curve 39b and 39c the intensity value for FIG. 4b, curve 39b the intensity value for FIG. 4c. The signal intensity for FIG. 4a, 39a corresponds to the value of 4, for FIG. 4b, 39b corresponds to 1 and 39c corresponds to approximately 0.8, and for FIG. 4c to 1.

The shape differences in curves 39b and 39c give an idea of what the deterioration of the signal due to the width of the spot light can represent. The ratio of the width of the light spot and the width of the division is approximately equal to: B/R=2.22*Lambda*f/E*E For example, for a value of E=20$\mu$m and f=80$\mu$m, the recovery is equal to 30% of what the curve 39c approximately corresponds to. The shape of this curve shows that the device proposed for an increase of the resolution through evaluation of the produced electric signal can no longer be applied in the case of the curve 39c.

It must be pointed out that the size of the alternating signal generated by the combining of both sensitive elements 6a and 6b enable to reach an amplitude of alternating intensity of:

a factor of 8 for FIG. 4a a factor of 1 for FIG. 4b under ideal conditions ba figure of 2 for FIG. 4c

It is clearly evident that, for an equal unit resolution, the invention's solution ensures a signal of a value much higher than that of present technology. It should however be noted that the shapes of the curves 39 also depends on the quality of the shadow zones. Curve 24 in FIG. 1 represents a real measurement of a 16-$\mu$m lens and gives an idea of the illumination ratios encountered.

The formulas used in the calculation of the dimension of the light spot don't take the grating effects into consideration. Experience has shown that these values were correct.

FIGS. 5 and 6a–6d show different types of optical element. FIG. 5 shows a part of the graduation support 3 having a graduation 30 made of a series of optical elements or divisions 4 of which the focusing portion is made of cylindrical optical elements superposed to the division 4 of length 21 and of width 40 which can be aligned perpendicularly to the median line 32. The lens will have, for example, a width E 35 of 8 $\mu$m or more, a focal distance of a value between 2*E and 6*E and a length value between 50 and 600 $\mu$m. They correspond to a linear or essentially linear focusing portion.

The optical elements 4 or the focusing parts 31 can be made of the same material, preferably plastic which allows the graduation support to be produced at the same time as the optical elements, i.e. by injection moulding. It is also possible to shape the graduation by pressure of a tool on a rough shape of the graduation support. Many materials can also come into the design of the graduation support.

The graduation support 3 can have many different shapes and include geometric parts to simplify its assembling onto the device. The same graduation support 3 can have one or several graduations 30 comprising optical elements which are different and of the same type. The median line 32 can be a circle. It can correspond to the direction of the movement of the graduation support to a given point.

FIGS. 6a–6d show various possible designs of the optical element 4 having width 21 and length 40 which can include a focusing portion 31 which generates an irregular distribution of the light intensity on the image plane 7 in such a manner that the corresponding part at a high intensity can be defined by one or several light spots 11 which will preferably cover an oblongand/or mainly rectangular-shaped surface of the image plane 7. It corresponds to an essentially linear focusing portion.

The projection of the focusing portion 31 onto the graduation support 3 can be an oblong and/or principally rectangular shape.

A linear distribution of the light spots allows the light flux to be distributed in an optimal or selective manner on the sensitive elements 6.

FIG. 6a shows an optical element 4 of width 21 and length 40 with a focusing portion 31 of a biconical shape shaped by a conical volume whose focal value will be different from one point to another along the division, FIG. 6b with a cylindrical shape covering from one end to the other the optical element 4, FIG. 6c with a pyramidal shape with four sides recovering optical element 4 from end to end, FIG. 5d with a pyramidal shape with rounded tips only covering a part of the optical element 4.

The cylindrical or pyramidal-shaped surfaces can represent a close geometrical shape or an asymmetric shape better adapted for the desired optical characteristics. In the case of a circular graduation, the shape converges toward the center of the graduation curve; in the scope of a division for numerical value this shape will be asymmetric with regard to the optical axis 17.

A pyramidal form can include two rounded sides which enable over a cylindrical shape to design a light spot, which variation of dimension is less sensible to the variations of the distance between the support 8 and the graduation support 3.

The possibility of rounding the lens shape, for example into a cylindrical shape directed after the length 40 offers the additional possibility of concentrating more energy on the light spot or reducing the length of the light spot in the direction of the width 40 of the optical element.

The above examples can also include a Frensel-, binary- and/or diffraction-type lenses. Binary-type lenses have the disadvantage that they are both convergent and divergent, which generates the light intensity onto the focal point at a value of 50% in comparison to that which is obtained with a geometric lens. Pure diffraction type lenses present another possible form of execution.

Figure 7:
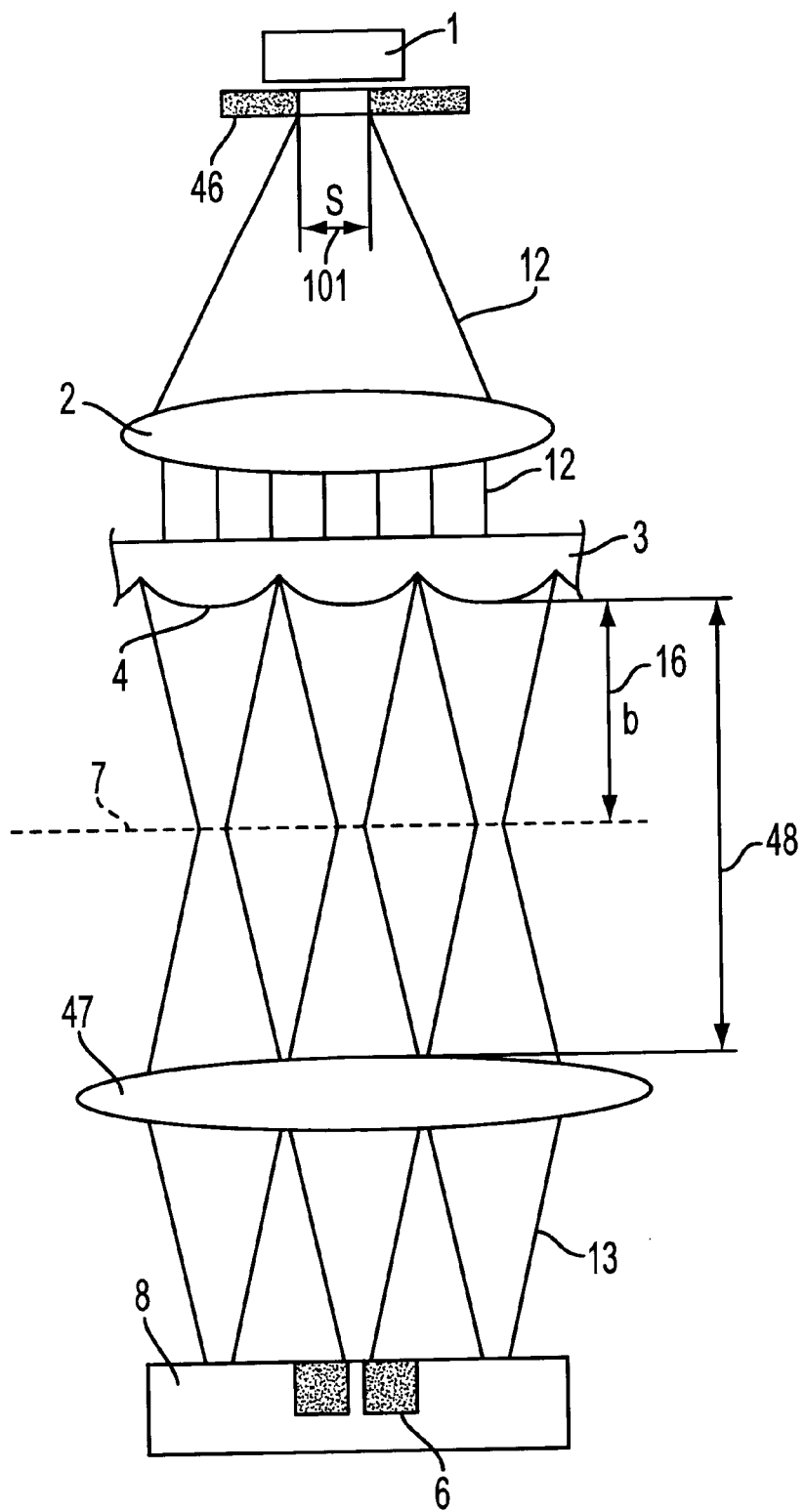
FIG. 7 shows an alternative design of the measurement device.

FIG. 7 shows a special disposition of the device. The light source 1 corresponds schematically to a diode 1 before which an opaque mask is placed which allows the dimension S 101 of the source or the light object to be defined. The light beams 13 are directed by an optical device 2 onto the graduation support 3.

The configuration of the receiving system includes an optical device 47 which gives the possibility to cast the image plane 7 onto the plane of the support 8 comprising the sensitive element 6 placed further away from the graduation support 3. This arrangement gives the possibility to design a device whose mechanical gap 48 is higher than the distance b 16, which can correspond to the focal length of the optical elements 4.

The mechanical parts can be freely disposed. A minimal focal distance can be chosen in order to get a better light output, the dimension S 101 of the light source 1 can be higher.

The optical device 47 can be made of one or several lenses whose optical plane will preferably be located between the image plane 7 and the support 8. It can also be made of an element capable of rendering a light spot created by a converging graduation (such as those seen in rotational encoders) on the support 8, into one series of parallel light spots 11. It can also be produced by plastic injection moulding. It allows the adaptation of an integrated circuit into a different geometric graduation in an inexpensive manner.

Figure 8:
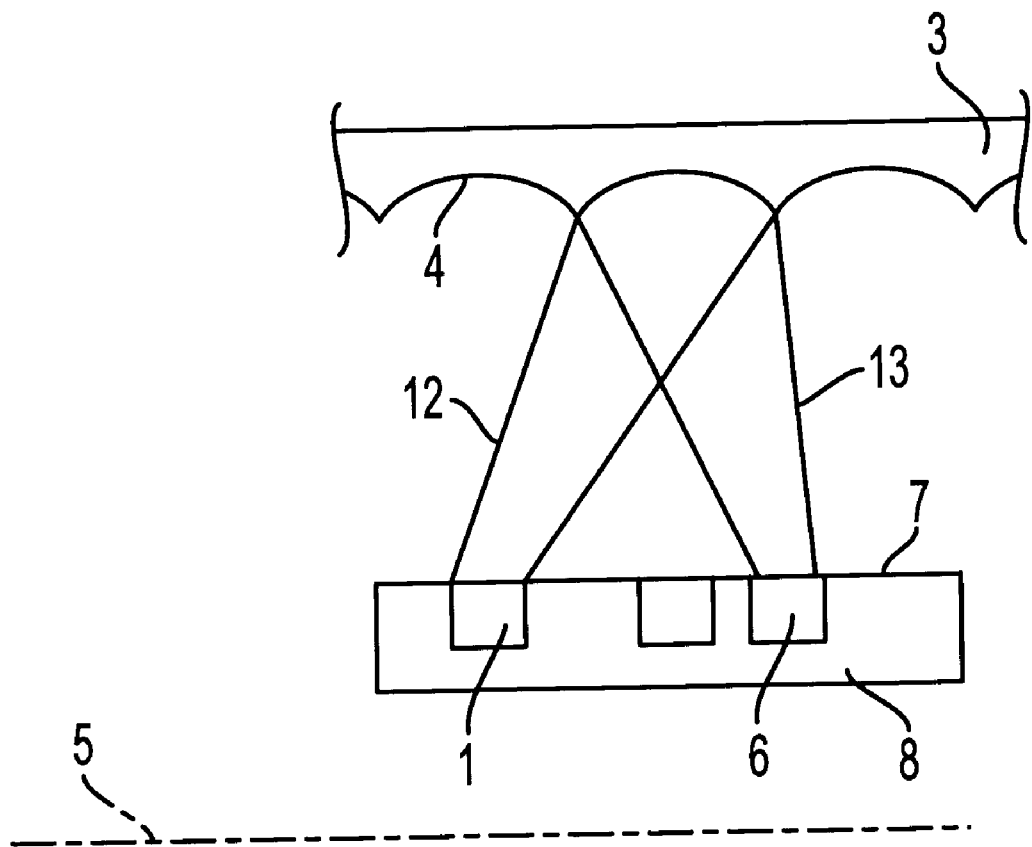
FIG. 8 shows another alternative design of the measurement device.

FIG. 8 shows a method of execution for a device working by reflection, including a graduation support 3, a reflecting focusing element 4, a light source 1 and sensitive elements 6. The lines 12 and 13 depicts the envelope of the useful light flux. The final plane 5 is located behind the image plane 7 which in this example contains the light source 1 as well as the sensitive elements 6.

A device working by reflection is more appropriate for use at high temperatures. For example, polycarbonate loses all its translucent optical qualities at high temperatures. The use in this example of an aluminium graduation support circumvents this drawback. Furthermore, it is easier to assemble the light source 1 jointly with the sensitive elements 6.

Figure 9A:
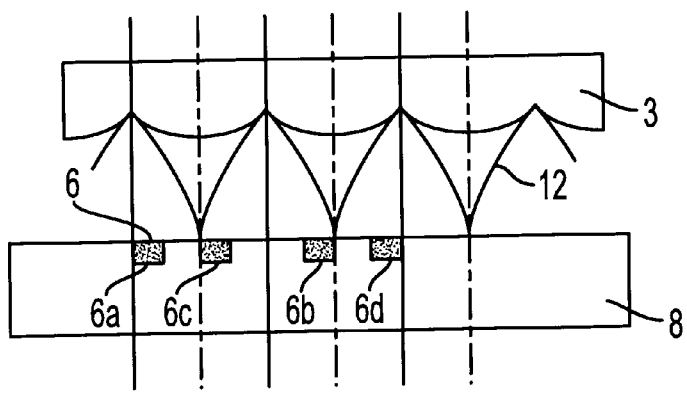
FIGS. 9a–9c show layouts of the sensitive elements.
Figure 9B:
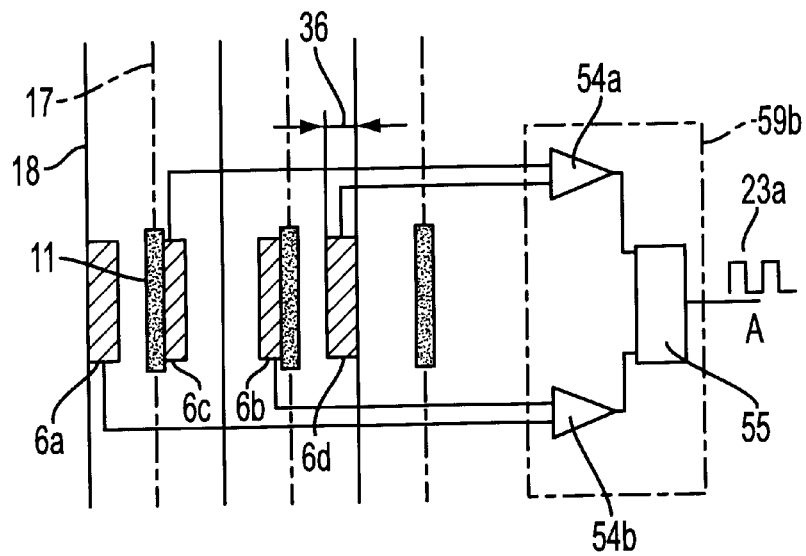
Figure 9C:
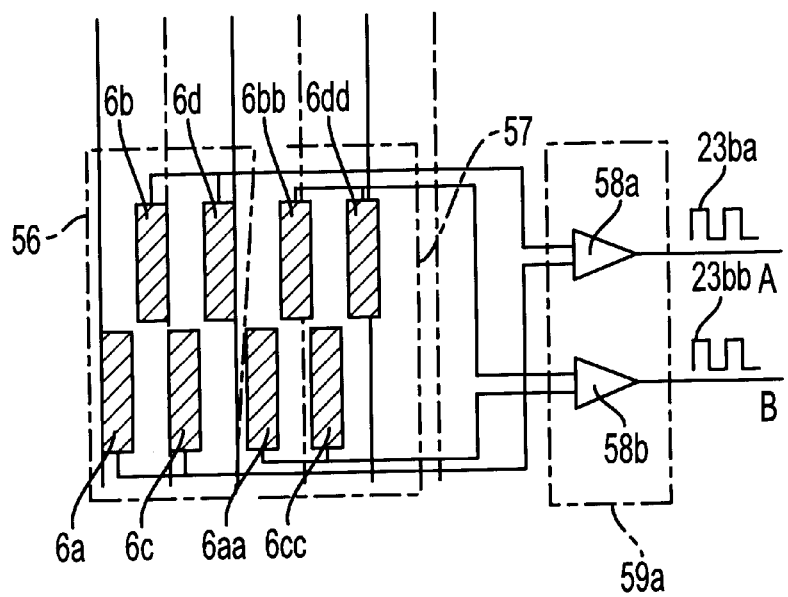

FIGS. 9a–9c show the disposition of the sensitive elements on the support 8 corresponding to the image plane 7 and a simplified representation of the detection circuit for the design of an incremental measuring device whose unit resolution is two times higher than the resolution of the graduation.

In a schematic manner, FIG. 9a shows a section of the graduation support 3, the image plane 7, the sensitive elements 6, and the light flux 13. Lines 17 show the optical or the division axis and lines 18 show the division's boundaries.

The sensitive elements constitute two groups of sensitive elements 6a/6b and 6c/6d which all relate to the same division and which are disposed geometrically along the projection of at least two divisions 18 on the image plane 7. An adequate spacing between the sensitive elements must be respected in order to avoid all forms of interaction in the working of the two neighbouring elements. For example, for a diode of the width of 4 $\mu$m, there must be a minimal distance between two elements of 3 $\mu$m.

FIG. 9b shows the disposition of the sensitive elements 6a, 6b, 6c, and 6d according to FIG. 9a, the light spots 11 and detection circuits 54a and 54b for treating a digital signal 23a which may correspond to an "A" channel. Sensitive elements 6a, 6b, 6c, and 6d represent a unit of sensitive elements. A first group of sensitive elements 6a/6b is connected to detection circuit 54a and a second group of 6c/6d to the circuit 54b. The circuits 54a and 54b process the signals of an alternation which are added or combined in circuit 55 to obtain the digital signal 23a. The conversion of the analog signal into a digital one can be done by the circuits 54 and/or 55. The detection circuit is denoted by 59b.

FIG. 9c shows another configuration of the sensitive elements including a unit of sensitive elements 56 having the elements 6a, 6b, 6c and 6d and a unit of sensitive elements 57 including elements 6aa, 6bb, 6cc and 6dd. Each unit includes two groups of sensitive elements. The distance between the two units will be of a value equal to ⅛ of the length 21 of the division.

Detection circuit 59a includes evaluation circuits 58a,58b which process an output digital signal 23ba,23bb representing the channels "A" and "B" from the point of the current emitted by the two pairs of diodes. It can also contain a resolver (not shown), which gives the possibility to increase the system resolution on the basis of a sine signal coming from circuit 58b and a cosine signal coming from circuit 58b and to produce the digital signals 23ba and 23bb.

The disposition of the detection circuit 59b in FIG. 9b provides an individual differential measurement for each group of sensitive elements. The detection circuit 59a in FIG. 9c does a differential measurement of the current emitted by each unit of sensitive elements comprising two groups of sensitive elements. Other dispositions are possible.

The disposition of the sensitive elements represented in FIG. 9b has the advantage of corresponding to a width of the light spot 11, which can be equal to the width of the element. The addition of a second unit of sensitive elements can be done by the disposition of the sensitive elements along four divisions in one row. It can also be done along several rows.

The disposition of the sensitive elements shown in FIG. 9c causes a unit of sensitive elements to appear by division which requires a disposition along two rows of sensitive elements. The disposition of the sensitive elements along the same row spread out along several divisions corresponds to a better light output of the device.

FIG. 10a refers to the disposition of the sensitive elements which, in terms of the invention, presents a favorable alternative design. The shape of the electric signal coming from the sensitive elements is defined by the shape and geometric disposition of the diodes 6a and 6b as well as the width B,10 of the light spot.

The diodes which correspond to the same division, i.e. 6a and 6b, can be placed side by side or in series divided up over several divisions. The geometric shape of both diodes periodically varies in function of the length of the division 21. As the light spots 11 are being shifted along the median line 32, these spots will recover (at least along a part of the division) both diodes 6a and 6b simultaneously and both surfaces delimited by the intersection of the light spot and each of the diodes 6a and 6b should substantially vary and generate a usable alternating signal 22.

The minimal width of the light spot B,10 corresponds to a faithful reproduction of the diodes" shape which, in some way, is imprinted in the silicon.

FIG. 10b shows a type of design suitable for generating sinusshaped signals, near-sinus shapes for FIG. 10c, and FIG. 10c also shows serrated shapes. This last design combined with a graduation made of juxtaposed cylindrical lenses would allow the sensor described by Kawamura to be improved. FIG. 10d shows yet other alternative shapes.

In a schematic manner, FIGS. 11a–11d show a section of the graduation support 3, several different types of optical elements or division 4 which are assigned a numerical value of 60, the image plane 7 and the division lines 18. The direction of the light flux is represented schematically by arrow 61 directed toward the location of the light spot 11.

The optical elements 4 have different shapes and optical characteristics. These correspond to a shape and/or location of a light spot 11 in relation to the image plane 7 or the perimeter 33 which are different from one division to another and can be detected by the sensitive elements 6.

Figure 11A:
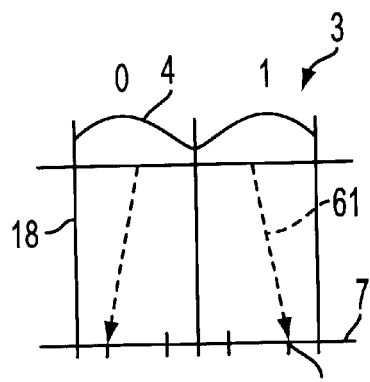
FIGS. 11a–11d show a numerical value graduation.
Figure 11C:
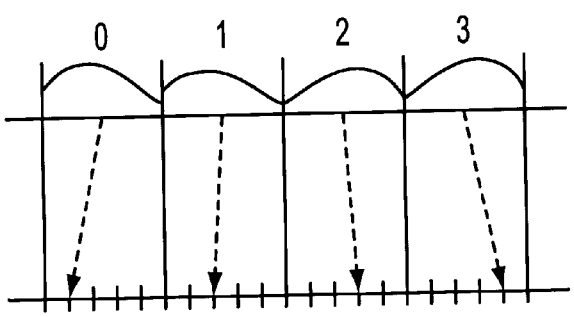
Figure 11B:
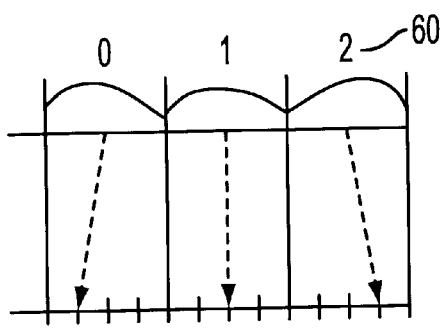
Figure 11D:
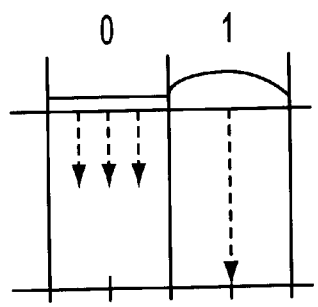

In a schematic manner, FIG. 11a shows a portion of graduation support 3 containing two types of optical elements with different optical properties represented by 61 and which correspond to a binary numerical value 27. This is the same for FIG. 11b and FIG. 11c which show a graduation comprising a value of base 4 and respectively base 3.

FIG. 11d shows a variation of the graduation made of two types of optical elements with a symmetric focusing portion and an optical element without a focusing portion which can represent a transparent, opaque or reflecting section. The difference of the light intensity on the image plane 7 provides the possibility to detect with the help of a group of sensitive elements 6 the type of division which is present. The value 60 can have a binary base.

A graduation can contain any amount of different type optical elements. This amount corresponds to the number base of the numerical value of 60. This number is limited by the design and the manufacturing tolerance considerations.

Figure 12A:
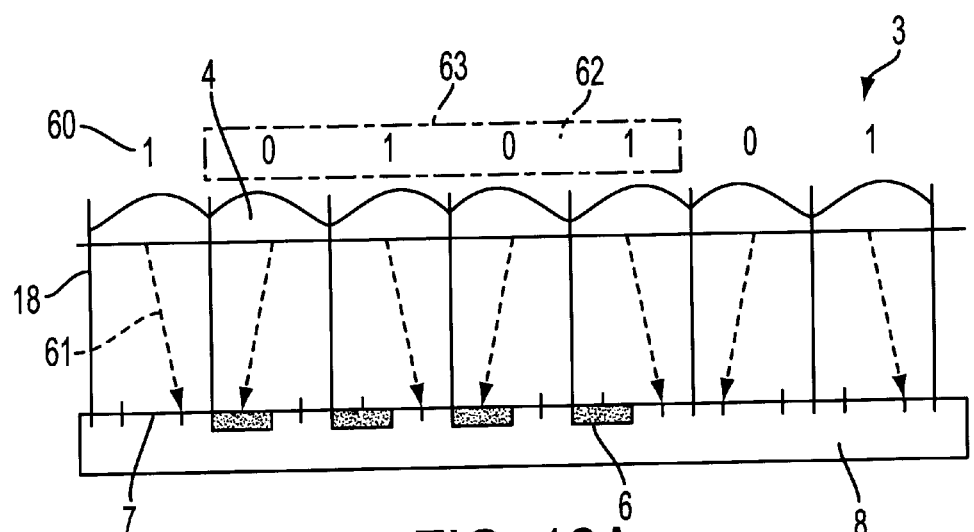
FIGS. 12a–12b show an example of a linear detection code.

In a schematic manner, FIG. 12a shows a section of the graduation support 3, of the asymmetrical optical elements 4 with a binary value of 60, of the image plane 7 where four sensitive elements represented by 6 are disposed in the projection of four divisions. Lines 18 represent the division boundaries and the arrows 61 the direction of the light flux in a schematic manner.

The detection capability of this design corresponds to the four numerical values within the frame 63 which corresponds to a position number 62 which can be detected by the sensitive elements 6 which can also correspond to a group or a unit of sensitive elements.

The position number 62 can denote the position of the graduation support 3 in relation to the support 8. The length of the position number 62 can be of any values and depends on the number of divisions analzyed by the sensitive elements on the image plane 7. The analyzed divisions can refer to one or several graduations.

Figure 12B:
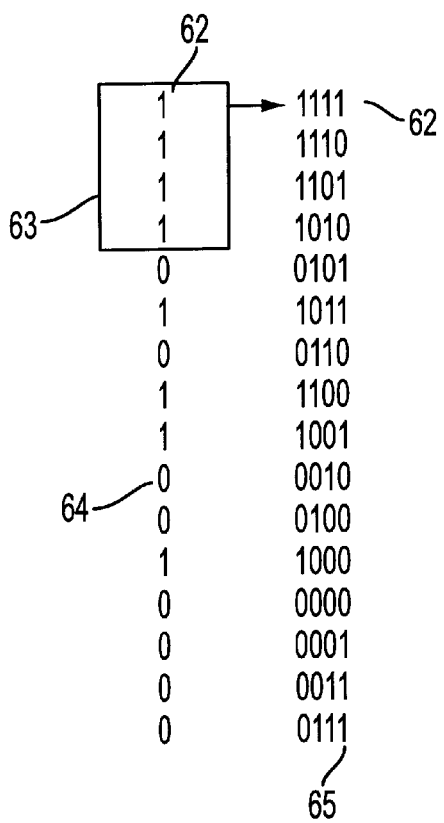

FIG. 12b shows the mathematical procedure to conceive an absolute measurement device by using only one graduation having two types of division. The disposition of the divisions in numerical value in terms of graduation is shown at 64. Frame 63 will show a 4-bit position number 62 moving from top to bottom, which will take a different value for each position of the frame as the arrow indicates as shown in column 65. The same procedure will be used for a position number with a different number of bits.

Figures 13A, 13B:
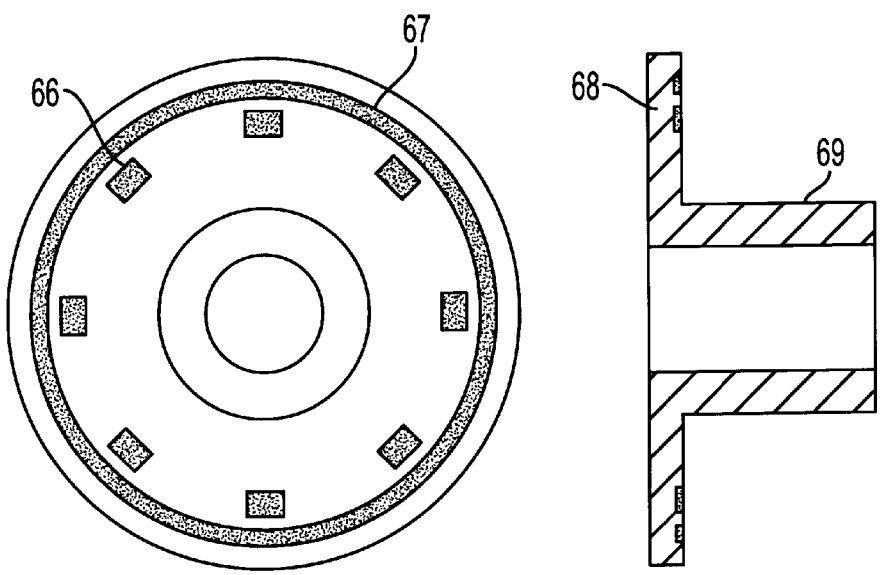
FIGS. 13a–13b show a graduation support for an encoder.

FIGS. 13a and 13b show a graduation support made of a flask 68 and of a hub 68. The flask has a graduation 67 made preferably from identical optical elements and a second graduation made of graduation segments 66 capable of acting as an index. Each segment can contain one or several optical elements. A preferred disposition consists in placing several types of optical elements in such a way that each segment corresponds to a position number 62. Each segment preferably has a reference code.

A reference code consists of a graduation made of several types of optical elements of which a part is of a particular design which can ensure a mathematical base, for example of 2,3, for the reading of the position number 62. It can be a question of a combination of particular optical element types. The use of a position number with a number base of two or three provides the possibility to design such a reference code in a simple manner, reserving for example a digit as a reference point which appears in the position number 62. The reference code can be disposed in a line or on a distinct graduation.

The advantage of this device is the design of quasi-absolute encoders which allows a quick reading of a reference point.

Figure 14:
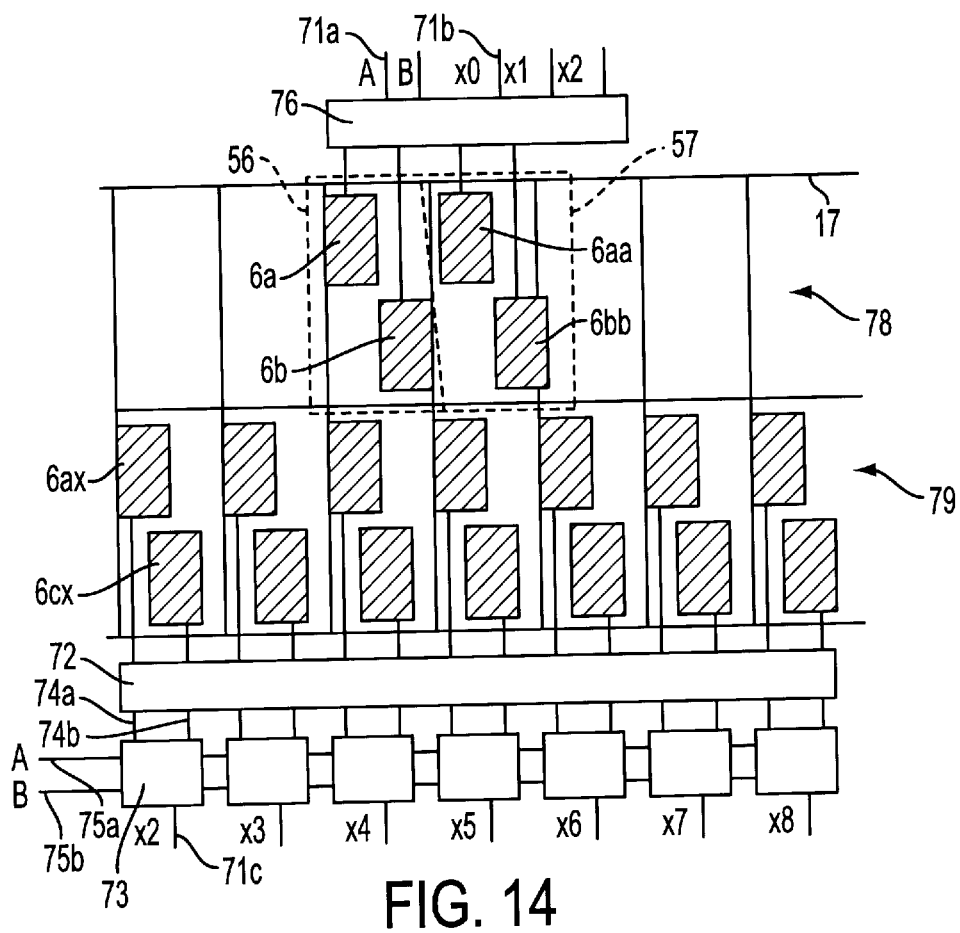
FIG. 14 is a circuit for an absolute encoder.

FIG. 14 shows a possible disposition of the sensitive elements and the design of the detection circuit for a 9-bit resolution absolute measurement device. The device has a graduation 78 which is made of identical optical elements and a graduation 79. which is made of different optical elements. The graduations are represented by the lines 18 which represent their projection onto the support 8, a detection circuit represented by the elements 76, 72 and 73 which can contain one or several memory zones, the output lines by 71a, 71b, and 71c and the internal connections of the detection circuit by 74a, 74b, 75a and 75b. The value of the position signal of the output lines 71b and 71c correspond to the digits x0, x1, x2, x3, x4, x5, x6, x7, and x9 of the position number 62.

The first graduation 78 is made of identical optical elements. A first unit of sensitive elements 56 includes a group of sensitive elements containing two sensitive elements 6a and 6b. A second unit of sensitive elements 57, brought forward in respect to the first unit by a distance equal to ¼ of the dimension of a division, includes a group of sensitive elements including two sensitive elements 6aa and 6bb.

The second graduation 79 is made of a series of divisions composed of two types of different optical elements (FIG. 13a). The sensitive elements are distributed into a first group of seven units of sensitive elements 6ax corresponding to seven divisions. A second group is composed of seven units of sensitive elements which are brought forward by a distance equal to ¼ of the dimension of a division. It is represented by a series of sensitive elements 6bx.

The sensitive elements of the units 56 and 57 are connected to circuit 76 which processes (with a resolver) the digital signals corresponding to the channels "A" and "B". The detection circuit processes the first digits of the position signal 62 which distinguishes the position of the light spot in terms of the sensitive elements 6a, 6b, 6aa and 6bb. In this example, they are the first two digits x0 and x1. They could also be several digits in function of the resolver-integration rate.

Each group of sensitive elements 6ax and 6cx which correspond to a division is connected to circuit 72 which allows the position of the light spots to be localised. Each group of sensitive elements relates to the first position signal 74a or 74b processed by circuit 72.

Values 74a and 74b are picked up by circuit 73. Each circuit 73 receives the signals 75a and 75b which can correspond to the output signals 71a or a position signal which help to detect the relative position of one division of the graduation 78 in relation to the support 8. Each circuit 73 enables to determine by logical analysis the numerical value of the division with the help of the position signals 74a, 74b, 75a and 75b which are shown by a position signal 62 on the output line 71c following the example in FIG. 14. The operation of circuit 73 enables synchronization of the reading of the numerical values which correspond to the graduation 79 using position signals corresponding to the graduation 78.

Each circuit 73 corresponds to a division and a line 71c for a position signal showing a digit "xn" of the position number 62. The graduation 78 can correspond to several digits of the position number 62.

The graduation 79 can correspond to several graduations having different types of optical elements. A division of the graduation 79 can correspond to several groups of sensitive elements and each group can correspond to several sensitive elements.

Each graduation can correspond to several units of sensitive elements which can be spread out in several groups along the graduation and several sensitive elements can correspond to each group of sensitive elements and several groups of sensitive elements can correspond to each unit. The length of division can be different from one graduation to another.

Figures 15A, 15B:
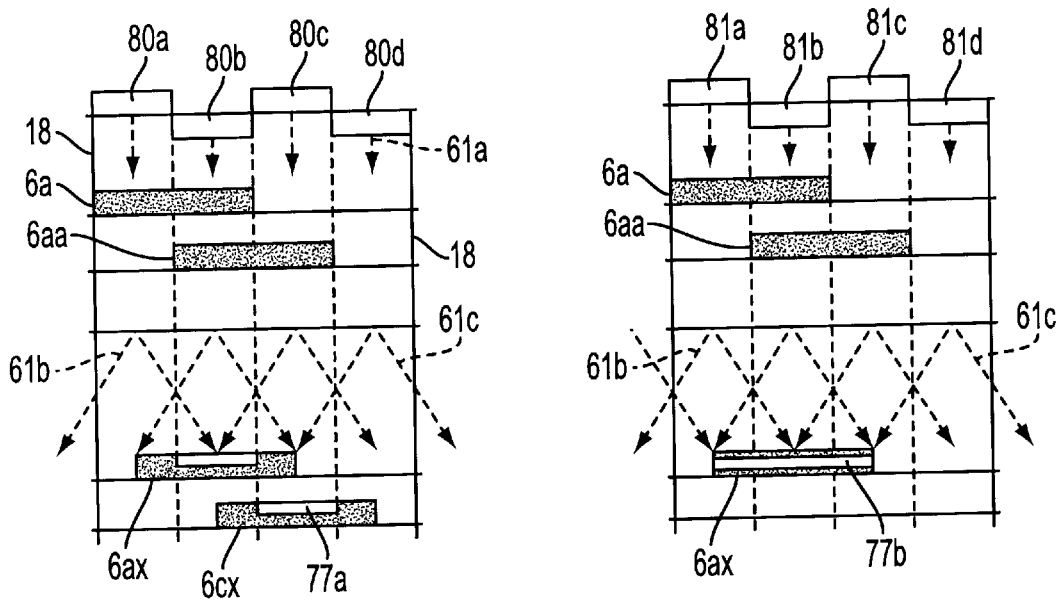
FIGS. 15a–15b shows synchronization of the position signals.

FIG. 15a shows the disposition and the procedure allowing the function of circuits 73 to be formulated.

Rectangles 80a, 80b, 80c and 80d correspond to sectors appropriate for the position of the division center of graduation 78 and/or 79. Both lines 18 show the boundaries of a division in relation to the sensitive elements 6a and 6aa corresponding to the graduation 78, of which the light flux is shown by the arrow 61a. The sensitive elements 6ax and 6aax and light flux 61b or 61c correspond to the graduation 79. The numerical value attributed to the light flux can be "1" for 61b and "0" for 61c.

The sensitive element 6ax is used for the numerical assessment of the division in position 80a and 80c, and element 6cx in positions 80b and 80d. A position 80a corresponds to a reversal of the signal 74a, a position 80b to a reversal of the signal 74b, a position 80c to a same signal 74a, a position 80d to a same signal 74b. The other combinations are not used. Actually, only a portion of the width of the sensitive elements is in effect used for the determining of the position number 62. The active portion of the sensitive elements 6ax and 6cx is shown by the empty rectangle 77a.

An absolute encoder is complete with a revolution-counting circuit which is preferably battery powered. Such a counting circuit is not shown in the above circuit.

FIG. 15b shows another configuration of the sensitive elements along the graduation 79 where a sensitive element 6ax only corresponds to each division. The position references 81a, 81b, 81c and 81d correspond to the position references 80a, 80b, 80c, and 80d in the FIG. 15a. The same reasoning relating to the logical function of circuit 73 can also hold true. At positions 81b and 81d, the influence of the light flux 61b or 61c onto one part of the sensitive element can produce two different signals 74, which does not guarantee a correct detection of the position number 62. The active portion of the sensitive element 6ax and 6cx is shown by an empty rectangle 77b.

A reduction of the active portion 77b of the sensitive element 6ax allows these errors to be eliminated. The detection of the division value 62 is therefore only done in relation to 81a and 81c. The value of the signals 71c can be recorded in circuit 73. This design presents a practical disadvantage in that while the current is applied to the device, a detection of the absolute position on the points 81b and 81d is not guaranteed. It is therefore necessary to obtain the absolute position by a small shifting.

Another possibility consists in monitoring the modifications of the number's position 62 in several memory registers. A change in position can be confirmed or secured on the base of this information. A memory table can include, for example, three position numbers, the present value and both nearby numbers. The nearby position numbers can be calculated as the need arises. This design can have the disadvantage of a possible loss of the absolute value.

The disposition of the sensitive elements, the divisions and the numerical values in the cited examples can be assigned differently.

The adaptation of a circuit integrated to several types of graduation is related with complex and expensive development work of integrated circuit. It would be preferable to design a circuit containing a quantity of sensitive elements which can be linked by bonding or metallic connections with a single lithographic mask.

Figure 16:
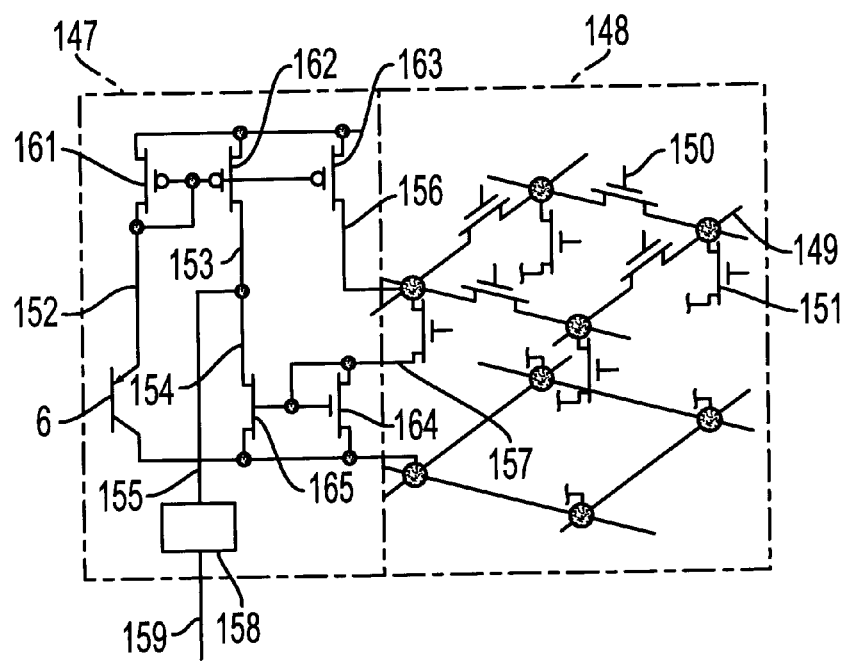
FIG. 16 is an example of a neuronal circuit.

FIG. 16 shows a neuronal circuit adaptation to the device which can be used for the making of or a part of a detection circuit. The circuit includes a neuronal network 148 with the characteristic nodes 149 which are attached to a circuit 147 which can include a sensitive element 6 and produce an output digital signal 159 capable of corresponding to the output lines 71a, 71b, 74a and 74b shown in FIG. 15. Each network node 149 is linked to its neighboring diode preferably by a resistance 150 and toward the mass preferably by a conductance 151. Elements 150 and 151 can be one or several resistances and/or transistors preferably having a linear characteristic. The tension of the junction can be carried by one or several circuits not shown in the figure which, failing this, can depend on circuit 147. The choice of the values for conductances and/or resistances are determined for the sensitivity of the detection circuit.

Circuit 147 includes a sensitive element generating current 152. The arrangement of the transistors 161, 162, and 163 generate currents 153 and 156 of the same value as of current 152. Current 157 results from the sum of the currents given out by the sensitive elements. The arrangement of transistors 164 and 165 defines the current 154 showing the difference of the currents 153 and 155 which will be transformed by an evaluation circuit 158 at the threshold level in binary value.

This type of circuit has the advantage of being able to control a large number of sensitive elements while, at the same time, being capable of being integrated with the sensitive elements on the same support 8. This is particularly useful for the manufacture of an absolute encoder circuit detection.

Figure 17A:
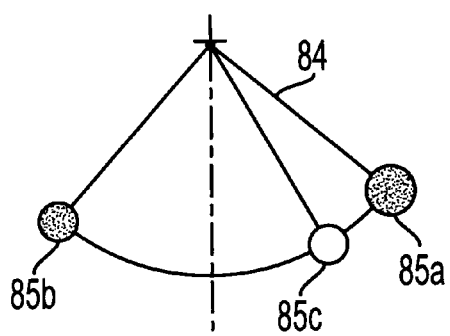
FIG. 17 shows oscillations and procedure for detection.
Figure 17B:
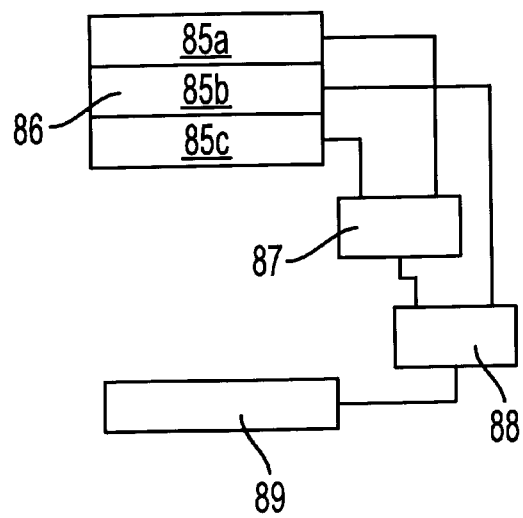
Figure 18A:
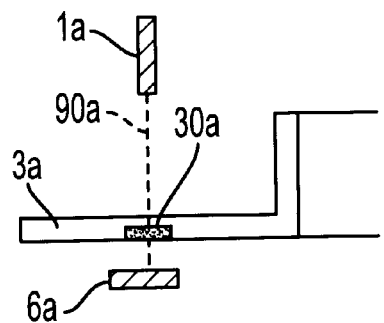
FIGS. 18a–18f show a disposition of the light source.
Figure 18B:
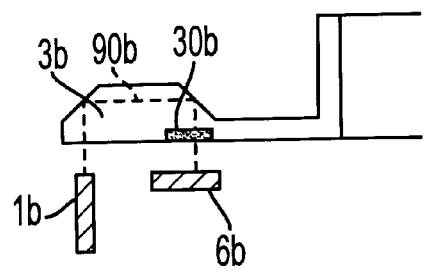
Figure 18C:
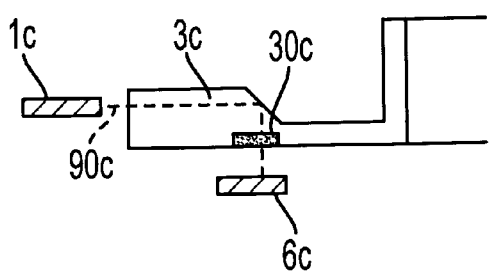
Figure 18D:
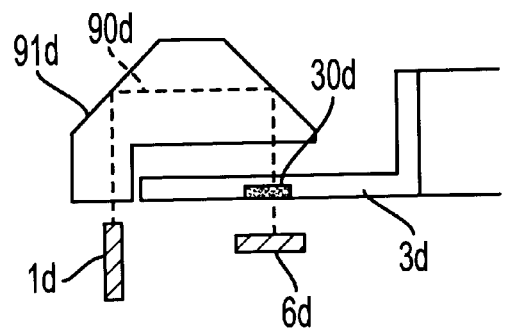
Figure 18E:
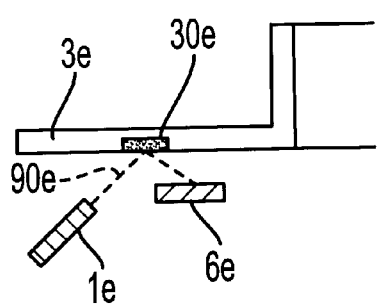
Figure 18F:
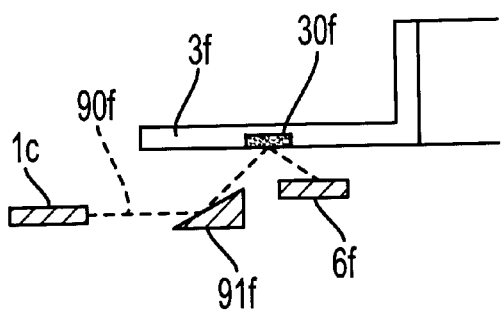

FIG. 17a and 17b show an oscillation device 84 and a procedure to calculate the average position of the oscillating device 84 and the maximum amplitude of the three last oscillations 85a, 85b and 85c. A rotational register 86 puts the 3 values 85a, 85b and 85c into memory. The average value of 85c and 85a is calculated by circuit 87 and the average value between the output of circuit 87 and value 85b are fed to circuit 88 for the recording of the real value immediately after the recording of a new value 85c.

This procedure allows a sensor for a rapid reading of the position data to be devised without necessarily having to rely on a damping device.

FIGS. 18a, 18b, 18c, 18d, 18e and 18f show different dispositions of the light source 1, graduation support 3 corresponding to a half-section of a circular support, the graduation 30, optical element 91, the light flux 90 and one or several sensitive elements 6.

The advantages of the present invention are as follows:
  the design of sensing element for reaching a very high resolution to the order of 0.0005 angles with a simple circuit,
  the design of a sensor whose measurement will be stable in terms of times, even during temperature changes and high humidity,
  very low frequency resonance
  and for use in vehicle movement sensors:
    a very accurate measurement of small accelerations to the order of 0.5 mg,
    a design presenting attractive manufacture costs for the automobile industry,
  and possibility to manufacture a 10 to 16 bit digital potentiometer of small dimensions and at competitive prices.

Figure 19:
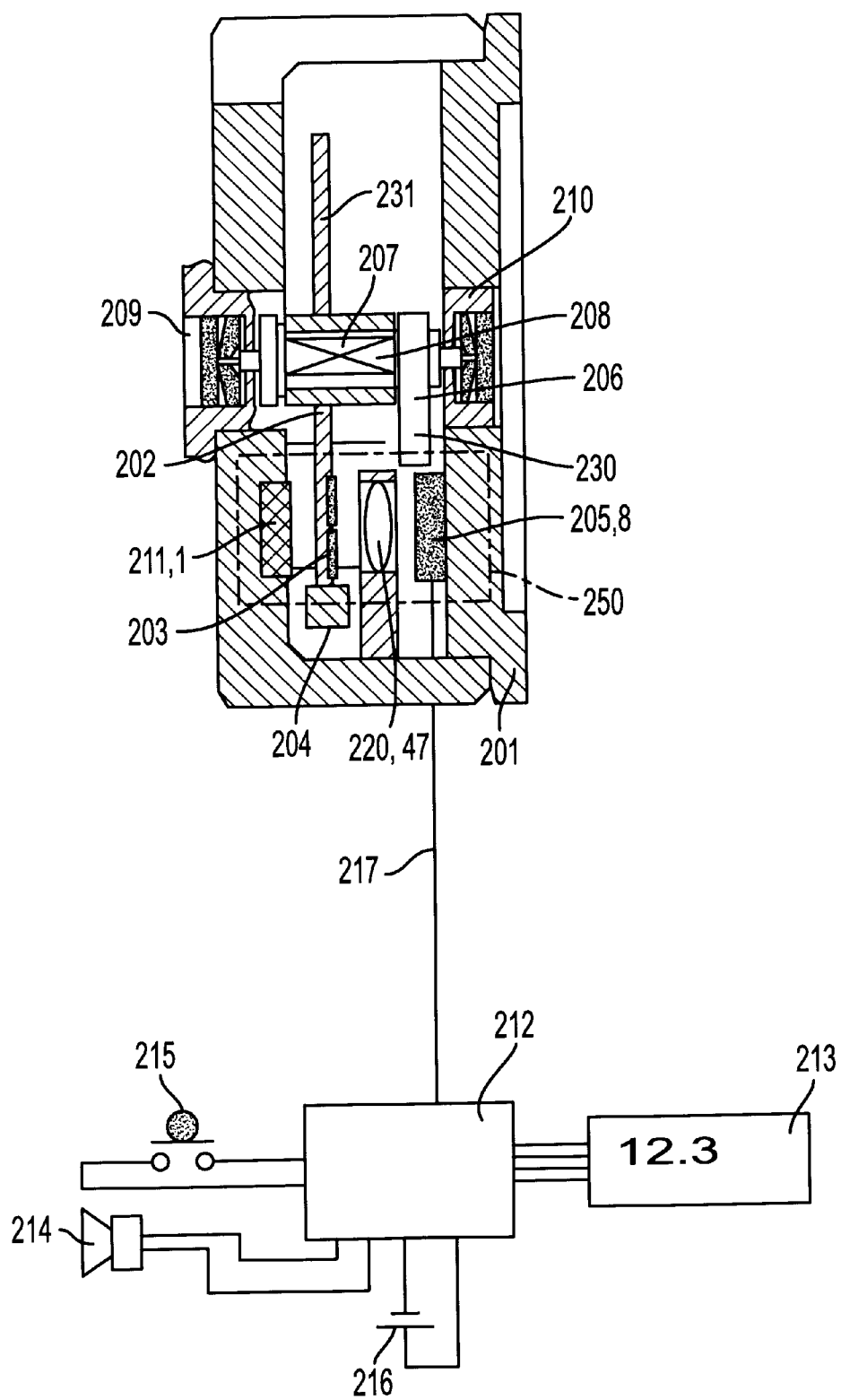
FIG. 19 shows gravitational sensors.

FIG. 19 shows a gravitational sensor unit with its control circuit containing a casing 201, an oscillating mechanical system 231 including an off-center mass 204 and a disk 202 on which one or several graduations 203 can be placed for reading the position or the angular displacement of the oscillating system 231 by one or several sensing heads 205.

The oscillating mechanical system 231 is placed on a low-friction bearing with limited angular movement 207 firmly attached to the shaft 208 which forms, via the off-center mass 206, a second oscillating mechanical system 230 which is placed preferably on two plain bearings 209 and 210 being part of the casing 201. The watch maker pivot bearings 209 and 210 are part of the casing and are preferably shockproof.

One or several reading heads 250 or groups of sensitive elements 6 are to be placed preferably in an equidistant manner on a circumference corresponding to the dimensions of the scale of the division. The shown reading head 250 includes a light source 211, an optical device 220, and one or several sensitive elements placed preferably on an integrated circuit 205 or support 8.

Two reading heads are to be preferably placed 180° from one another to compensate for the errors of eccentricity of the graduation of circular scale 203 in relation to the center of rotation of one or several of the sensor's bearings during the reading by counting of the impulses coming from the two systems.

The light source 211 may be a light diode or a radioluminessence source activated for example by Tritium which supplies the necessary energy to detect the displacement of the scale 203 by the intermediary of the integrated circuit 205.

The optical system 220 has the task to ensure an accurate reading of the scale's position. When the scale's division becomes small, the distance between the disk and the detection circuit becomes critical. The bonding wires and the mechanical assembly may restrain obtaining of optimal reading conditions. It therefore becomes necessary to introduce, for example, an optical element composed of one or several lenses projecting the image of the light flux onto the plane where the sensitive elements are placed. Another possibility rests in the use of a bunch of optical fibers containing several optical fibres placed side by side which are to be preferably fixed on or glued to the sensors' surface.

The scale or graduation 203 will be preferably composed of a series of optical elements. These optical elements can be made by plastic injection or mechanical printing in a plastic or metallic support.

It can also be composed of, for example, a metallic pattern applied on a piece of glass or plastic (if possible transparent) at the source of the radiation emitted by the photo-electric source 211. It is also possible to conceive a scale including a reflector element and/or an alternation of variable-translucent and or different-filtration elements in function of the light's wavelength and/or transparent focusing optical elements.

The disk 202 of the oscillating sytem 231 can also rest on bearings 209 and 210 which however can reduce the mechanical resolution of the sensor. Instead of friction bearings 209 and 210, can be used miniature roll bearings, ordinary friction bearings and/or bearings controlled by magnetic suspension, that is, whose position is controlled electrically. The use of bearings made of permanent magnets is also foreseeable with suitable materials.

The use of several graduation scales 203 has the advantage of easy switching from one system to another, for example mm/m to an angle degree (360 divisions) or other values without the need to convert these values for example by calculation.

A digital circuit 212 preferably representing a microprocessor system connected by one or several conductors 217 to the integrated circuit 205 is responsible for the management of the measured values, the optical indicator display 213 or by acoustic methods 214, the management of one or several push buttons 215 and other operations to be integrated into the system. Preferably, a battery 216 should supply the power to the electric circuit.

FIG. 20 shows a plain bearing, the axis 219 of diameter "d" rests on a bearing 218 of diameter "D". Point 220a depicts the center of gravity of the oscillating system. Point 222 depicts the maximal position of the center of gravity before the sliding of the axis 219 in relation to the bearing 218. Vector 224 shows the weight of the disk "G" and vector 223 shows that the maximal friction force equals 1×D/2×G. The value "e" shows the distance between the axis of rotation and the center of gravity of the oscillating system.

The layout of both vectors show the relation between the forces coming into action before the sliding of both parts. The extreme position of the centre of gravity 222 and the diameter value of the bearing 219 as well as the friction coefficient determine the minimal angular mechanical resolution of the system which is equal to=2×arctan ((1o×D)/(2×e)) Where for example, the minimal angular mechanical resolution of the system has values of D=70 1 m, 1 mo=0.12, e=5 will be 0.096 degrees.

Another type of bearing consists of a segmented plain bearing where the corresponding diameter can be reduced to very small values such as for example 10 1 m before either the resistance or the manufacturing becomes impossible. A resolution with the values D=10 1 m, 1o=0.12, e=5 is 0.014 degrees.

Another type of bearing consists of a very low-friction roll bearing whose minimal angular mechanical resolution is equal to=2×arctan (0.00066*√(d/2)/(e)) The minimal mechanical revolution with values of D=200 $\mu$m, d=180 $\mu$m, $\mu$o=0.12, e=5 is 0.00454 degrees. Other types of bearings consist of flexible parts preferably a spring allowing the making of a suspension of a limited angular, low-friction clearance but which has the disadvantage of introducing a proportional force in the spring displacement.

The use of a low-friction bearing with a restricted angular movement combined with a second oscillating system 230 provides the possibility to keep the advantage of the first name bearing type. The first oscillating system 231 is conceived in such a way that it can oscillate at an angle value at least higher than the angle value of the angular mechanical resolution of the second oscillating system 230.

FIG. 21a shows a simple type of roll bearing having an axis 219 on which a bearing 218 rests and of which the angular movement is limited by a pin or a digit 221 firmly attached to the axis 219 capable of moving in the interior of the opening 222 firmly attached to the bearing 218.

Both rolling surfaces of parts 219 and 218 can be smooth and preferably completely or partially geared in such a way that a relative angular sliding of the two oscillating systems can be avoided. Gear cause extra friction to the detriment of the system's advantages. The use of involute gear with a wide pressure angle could reduce friction. The use of another gear profile can also be envisaged.

FIG. 21b shows a more rigid solution which develops more friction including an axis 219 of radius "r" and a bearing 218 of radius "R". This design has the advantage of guaranteeing the angular position between the two oscillating systems 231 and 230. The free movement angle can be controlled by the bearing or by an extra stop similar to the one shown in FIG. 23a.

Figure 22:
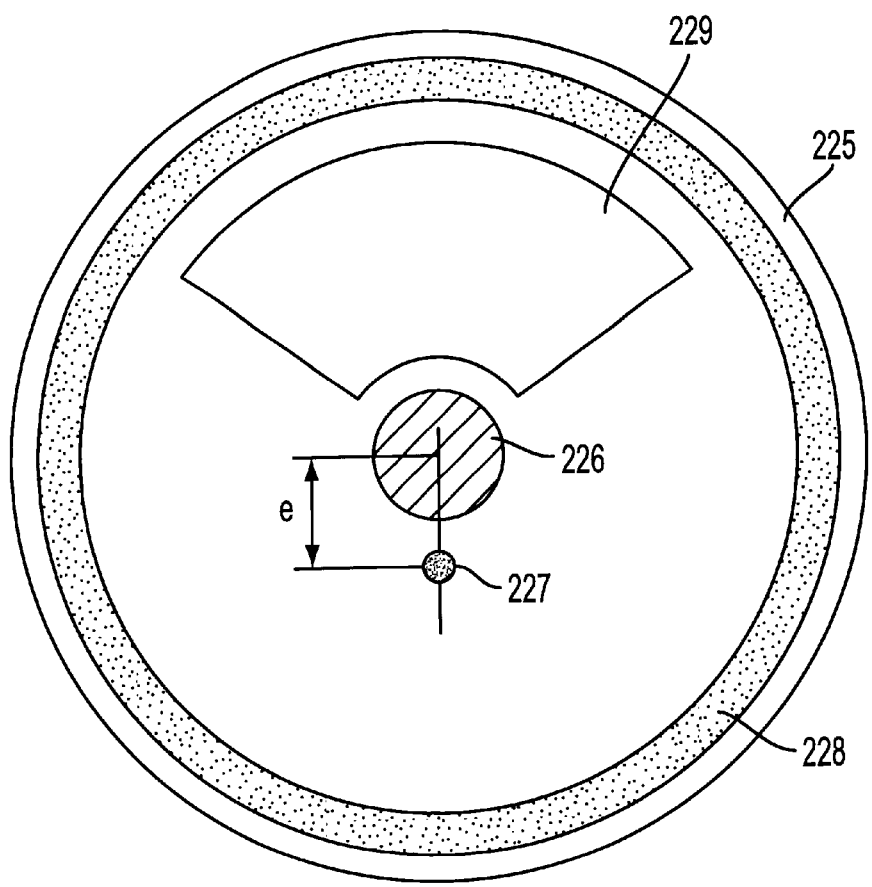
FIG. 22 shows an oscillating disc.

FIG. 22 shows a disk with preferably constant thickness 225, an axis 226 resting in a bearing with a greater diameter, an opening 229 allowing the displacement of the center of gravity 227 to a distance "e" along the axis of rotation of the disk 225 or of the graduation 228,22 which gives the possibility to assess the disk's angular displacement 225.

The distance of the center of gravity "e" in relation to the center of rotation of the bearing and the inertia mass of the disk 225 are two important values that define the resonance frequency of the system. A small value for "e" reduces the resonance frequency but on the other hand also reduces the mechanical resolution. For the design of a sensor with low resonance frequency, it will be necessary to choose low-friction bearings combined with a second oscillating system.

Figure 23:
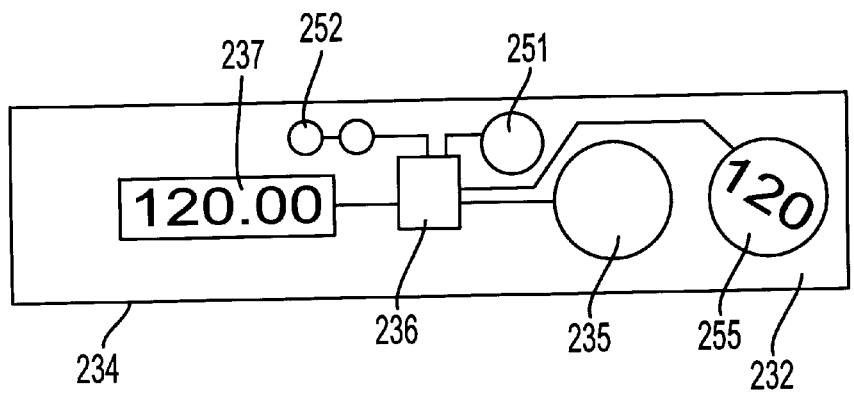
FIG. 23 shows an electronic level measurement device.

FIG. 23 schematically shows a electronic-bubble level measuring device with a body 232 with a reference surface 234. A gravitational sensor 235 as described above will be directly or with the help of an elastic or shockproof mechanism assembled onto the body of the device 232 and electronically linked up to a detection circuit 236 which, for example, will transmit the measured values to the user via one or several numerical display panels 237 and/or one or several acoustic signal elements 251 and/or one or several optical sign elements 252 and/or an adjustable display panel 255.

The display panel 255 can be adjusted manually and/or by means of an oscillating system similar to the oscillating system 231. The transmission of the signals for the display of the values can be done by metallic contacts and/or infrared transmission and/or inductive means.

This measurement device will also be able to measure the inclination of a plane with regards to the plumb line and/or to compare the inclination of one plane to another with great precision.

Figure 24:
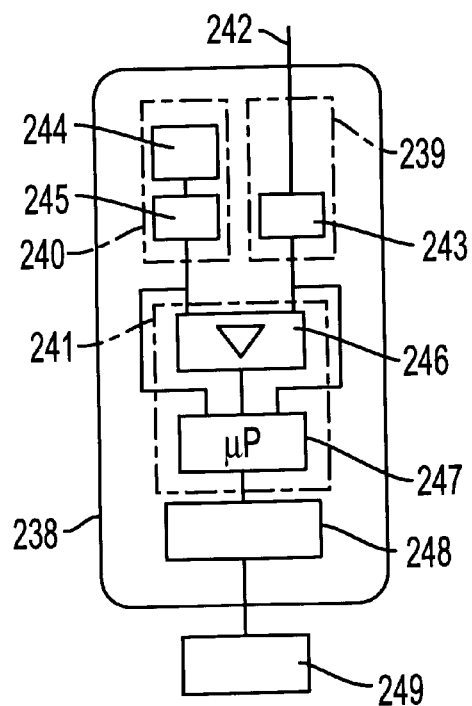
FIG. 24 is a unit diagram for an odometer.

FIG. 24 shows the function diagram of a kilometer recording device as described in the international patent request PCT/EP 93/02415 in FIG. 3a and 3b comprising a casing 238, a first evaluation unit 239 with a signal input 242 and a circuit for the processing of this signal 243 to which preferably a kilometre-impulse signal will be connected. A second evaluation unit 240 having a sensor unit 244, preferably for acceleration sensing, and a circuit for the processing of this signal 245, a circuit for comparing the signals 246, a digital circuit (for example a microprocessor 247), a memory unit 248 and a data output 249 for the transfer of the data to the exterior.

The implementation of a gravitational sensor as described above enable to fulfil the conditions required by the device in FIG. 24 in a simple manner and at low costs. The counting is done in a digital technique which can greatly simplify the working algorithms and reduce the calculation times for the second evaluation unit 245 as well as the adjoining electronic circuits to be reduced. It has the particular advantage of being easily calibrated by simply resetting the counter.

The values given by the acceleration sensor 244 and displacement sensor 242 that will be transformed by circuits 245 and 243 into acceleration or displacement values are compared in circuit 246. From the fact that a vehicle is not always oriented in the horizontal plane, the compared values will have measurement errors. Even so, an analysis of the comparison values by statistical methods will enable to indicate whether the values of the kilometric impulses are constant or correct.

This procedure enables to quantify the value of the received kilometric impulses in an automatic manner by comparison with the impulse values during the periods of acceleration which will ease the mounting of the device on a vehicle. It enables to ensure that the vehicle is sending the impulses to the recording system during the displacement of this and/or whether the value of these impulses is correct or not. The resulting values are kept in memory and log out at the same time as the kilometric data to a computer station which will evaluate the recorded data.

The use of a sensor with absolute reading enables to increase the system's reliability, which will support its measurements on a unchanged horizon which increases the reliability of the algorithms used in the control of the recording. The same calculation basis will be remaining even after a power cut.

Figure 25:
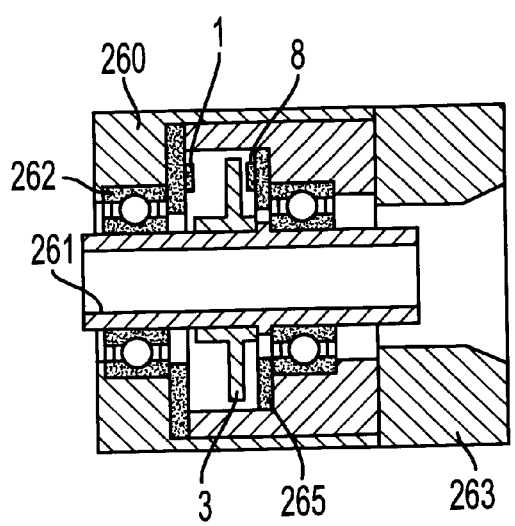
FIG. 25 shows an encoder.

FIG. 25 shows an example of an encoder comprising a graduation support 3 placed on a tubular shaft 261 in bearings 262, a support 8 where the sensitive elements located on a support 265 are placed, a light source 1, a casing 260,263 and ball bearings 262.

What is claimed is:

1. Method of determining with a light beam one of the relative position and the absolute position of a graduation support in relation to a support with an alternating signal, said alternating signal crosses a reference value at least two times, said graduation support and said support being displaceable relative to each other in displacement direction, the method comprising the steps of:

producing a light flux by a light source;

modifying said light flux by movement of at least one graduation of said graduation support;

providing light-sensitive elements on said support;

intercepting the modified light flux by said light-sensitive elements; and converting intensity of the intercepted light flux into an electric signal, wherein:

the light flux is modified by said graduation made of at least one series of optical elements, each optical element containing at least one focusing portion;

said modified light flux is such that it intercepts at least the entire width of an optical element of said at least one series, said optical element focusing at least one light spot of said light flux onto said support with said light-sensitive elements therein; and said light flux intercepted by said focusing part of said optical element is converted into said alternating signal from which said relative position or said absolute position can be determined whereby a maximum value of light energy received by at least one light sensitive element corresponds to one of a maximum electric signal value and a minimum electric signal value of said alternating signal.

2. Method according to claim 1 wherein a position signal, which depends on a division belonging to said at least one graduation made of several optical elements of different structure, corresponds to a position number including a reference code to show an absolute value of a position between said graduation support and said support.

3. Method according to claim 1 where at least one of several position numbers and at least one of several position signals corresponding to the absolute position between said graduation support and said support are stored in a memory to secure a correct detection of the position number.

4. Method according to claim 1, wherein at least one light spot is produced by said light flux on said support, said light spot having a shape selected from one of an oblong shape and a substantially rectangular shape.

5. Method according to claim 4, wherein at least one first position signal which depends on a division belonging to at least one graduation made of several optical elements of different structures, corresponds to a second position signal which depends on at least one position signal characterized by at least one graduation made of optical elements of identical structures capable of detecting the relative position of a division in relation to said support and which depends on said at least one first position signal, said second position signal corresponding to a digit of a position number to show an absolute value of a position between said graduation support and said support.

6. Method according to claim 4, wherein said at least light spot is arranged perpendicularly to a median line of said graduation.

7. A method according to claim 1, further comprising a step of digitally converting changes of said alternating signal produced by the relative movement of said graduation support and said support and using the digital conversion for determining the relative or absolute position.

8. A method according to claim 1, wherein focusing is by only the series of optical elements and divisions.

9. A device for determining with a light beam one of the relative position and the absolute position of a graduation support in relation to a support with an alternating signal, said alternating signal crosses a reference value at least two times, said graduation support and said support being displaceable relative to each other in a displacement direction along an axis, the device comprising:

a light source for producing a light flux;

a graduation support including at least one graduation placed in said light flux for modifying said light flux;

at least one light-sensitive element arranged in said support for intercepting said modified light flux, said at least one light sensitive element converting intensity of the intercepted light flux into a physical effect; and a detection circuit for producing an electric signal from said physical effect, wherein:

said graduation is made of one of at least one series of optical elements and divisions, each optical element containing at least one focusing portion; and said light flux intercepts at least the entire width of an optical element of said at least one of said series and by focusing produces at least one light spot on said support with said at least one light sensitive element therein; and the detection circuit is designed such that by a relative displacement of the graduation support in relation to the support said alternating signal is produced.

10. Device according to claim 9, where a projection surface, which corresponds to the projection surface of said focusing portion of said optical element on said support, is greater than a surface corresponding to an intersection of the surface of at least one light-sensitive element and said projection surface, and where the width of at least one light-sensitive element is inferior than one of the width of the projection surface of said focusing portion and the length of a division.

11. Device according to claim 9 where said maximum electric signal value of said alternating signal corresponds to said at least one of said light-sensitive elements (6a or 6a and 6c) and said minimal electric signal value of said alternating signal corresponds to said at least one of light-sensitive elements (6b or 6b and 6d) which by the comparison of produced signals by at least two light-sensitive elements (6a and 6b or 6c and 6d) can generate an alternating signal whose value is independent of the light flux produced by said light source.

12. Device according to claim 9, where a division corresponds to several light-sensitive elements which are arranged such that each of them forms an intersection surface with a perimeter corresponding to at least one division.

13. Device according to claim 9, where the width of the sensitive element is equal to or corresponds to a multiple of two of the length of the graduation.

14. Device according to claim 9, where a division corresponds to several groups of sensitive elements so that a unit resolution is greater than resolution of said graduation.

15. Device according to claim 9, which comprises at least a group of light-sensitive elements and wherein a length which is parallel to a dimension perpendicular to a median line, of at least one sensitive element, vary in a periodic manner by the length of a division.

16. Device according to claim 9, wherein said at least one sensitive element is integrated with at least a part of said detection circuit being used for treatment of digital and analog signals on said support.

17. Device according to claim 9, wherein a section of an image emitted by said light source is formed of one of an oblong shape, a rectangular shape and a shape equivalent to the shape of the sensitive element.

18. Device according to claim 9, wherein said light source is placed on one of a final plane and a plane between the final plane and said graduation support, and therefore the width of one or more light spots acting on said light sensitive elements can be defined.

19. Device according to claim 9, wherein at least two groups of light-sensitive elements are placed on the same plane at a distance measured parallel to a median line equal to ¼ of the length of a unit division and wherein said groups of light-sensitive elements correspond to two signals capable of defining a vector, itself defining a circular curve and an angle, which can situate with precision the position of said graduation support by evaluating emitted values of said two signals at one of a given point and a moment.

20. Device according to claim 1, wherein said graduation support is manufactured by injection moulding.

21. Device according to claim 1, wherein said graduation support contains at least one graduation made of optical elements of identical structure whose focusing portions modify the light flux in such that at least one of the shape and the position of said light spot in relation to a perimeter, which corresponds to a projection surface of the division on the support, is identical for each division.

22. Device according to claim 9, wherein said graduation support contains at least one graduation made of optical elements of different structure whose focusing portions modify the light flux such that at least one of the shape and the position of at least one light spot in relation to a perimeter, which corresponds to a projection surface of the division on said support, is different from one division to another which enables assigning a numerical value to one of a type of a division and a type of an optical element, said numerical value which can correspond to a selected mathematical base.

23. Device according to claim 9, wherein said graduation support contains a graduation made of optical elements of identical structure and at least a second graduation made of optical elements of different structure for synchronizing the detection of a numerical value of a division corresponding to a position of the light spot generated by at least one of several other graduations made of optical elements of different structure.

24. Device according to claim 9, wherein said graduation support contains at least a graduation formed by at least one segment of graduation corresponds to at least one reference index.

25. Device according to claim 9, wherein several graduation segments contain a series of optical elements of different structure to assign a position number.

26. Device according to claim 9, wherein at least one optical element of said graduation contains said focusing element corresponding to a lens of an essentially cylindrical shape with one of a rectangular base and trapezoidal base.

27. Device according to claim 26, wherein the focusing element is curved in the direction of its length such that a projected image on an image plane is shorter than the length of the optical element.

28. Device according to claim 9, wherein at least one optical element of said graduation contains a focusing element whose optical axis does not correspond to a symmetrical axis of the division.

29. Device according to claim 9, wherein said graduation support contains at least one of a reflecting element, the optical elements and said focusing portion, which works essentially by reflection.

30. Device according to claims 9, wherein said optical element corresponds to a Frensel-, binary- or diffraction-type of lens.

31. Device according to claim 9, wherein an optical device is placed between said graduation support a and said support, said optical device projecting an image of an image plane on a plane containing light-sensitive elements defined by said support.

32. Device according to claim 31, wherein said optical device includes a series of juxtaposed cylindrical lenses.

33. Device according to claim 31, wherein said optical device includes lenses in different forms having one of different sections and optical axes allowing the image plane to be formed, in the case of a rotational encoder, of a series of converging oblong light spots, into a series of at least two light spots which will be rendered parallel on a support.

34. Device according to claim 9, wherein the position of the image plane approximately corresponds to a multiple of a focal distance defined by the optical elements.

35. Device according to claim 9, wherein at least one of several sensitive elements and circuits containing at least one sensitive element are joined together by at least one of a conductive element and a resistive element which allows formation of a neuronal circuit.

36. Device according to claim 9, wherein said detection circuit corresponds to a graduation made up of optical elements; of different structure and contains a memory zone to store at least one of position signals and position numbers.

37. Device according to claim 9, wherein at least one of said graduation support and said support contains at least one optical element to deflect the light flux for a more appropriate arrangement of said light source and at least one of light-sensitive elements in relation to said graduation support.

38. Device according to claim 9, in combination with a gravitational sensor comprising a casing, a circular graduation support whose center of gravity is displaced in relation to a rotation axis forming an oscillating system; said graduation support including:

at least a graduation made of at least one series of optical elements, and light-sensitive elements arranged in said support, said graduation support having a center of gravity does not correspond to its center of rotation, the said support being supported by means of at least one bearing being part of the sensor casing or at least one low-friction bearing, preferably with limited movement, capable of being part of a second oscillating system supported by means of at least one bearing preferably being part of the sensor casing, and preferably an adjustable display panel.

39. Device according to claim 38, in combination with an electronic bubble level device to measure the inclination of a surface in relation to the plumb line which contains said gravitational sensor containing a graduation formed of optical elements of different structure, and a casing containing a reference surface used as a support for measurement of the inclination of a surface.

40. Device according to claim 38, wherein the device includes at least one of a visual interface having an LCD display and an auditory interface having an auditory alarm.

41. Device according to claim 38 in combination with a device to define, record, and evaluate data concerning the use of a vehicle which will be at least partly directly or indirectly attached to a part of the vehicle, comprising: two independent recording data units; a digital circuit including a microprocessor system, for calculation, comparison, and treatment of data coming from at least two recording data units; and a memory unit to store acquired data; and a communication circuit allowing an output of data, wherein one of the two recording data units includes at least said gravitational sensor which provides absolute or relative reading.

42. Device according to claim 9, wherein said at least one light spot is smaller than a surface on said support corresponding to a projection of said at least one focusing portion on said support.

43. Device according to claim 9, wherein said graduation support has a surface covered by a reflective layer.

44. Device according to claim 9, wherein said graduation has optical elements arranged on a circle.

45. A device according to claim 9, wherein changes of said alternating signal produced by the relative movement of said graduation support and said support is converted to a digital signal and said digital signal is used for determining the relative or absolute position.

46. A device according to claim 9 wherein-focusing is by only the series of optical elements and divisions.

47. Method of determining with a light beam one of the relative position and the absolute position of a graduation support in relation to a support, said graduation support and said support being displaceable relative to each other in displacement direction, the method comprising the steps of:
producing a light flux by a light source;
modifying said light flux by movement of at least one graduation of said graduation support;
providing light-sensitive elements on said support;
intercepting the modified light flux by said light-sensitive elements; and
converting intensity of the intercepted light flux into an electric signal, wherein:
the light flux is modified by said graduation made of at least one series of optical elements, each optical element containing at least one focusing portion;
said modified light flux is such that it intercepts at least the entire width of an optical element of said at least one series, said optical element focusing at least one light spot of said light flux onto said support with said light-sensitive elements therein; and
said light flux intercepted by said focusing part of said optical element is converted into an alternating signal, said alternating signal crosses a reference value at least two times, from which said relative position or said absolute position can be determined whereby a maximum value of light energy received by at least one light sensitive element corresponds to one of a maximum electric signal value and a minimum electric signal value of said alternating signal.

48. A device for determining with a light beam one of the relative position and the absolute position of a graduation support in relation to a support, said graduation support and said support being displaceable relative to each other in displacement direction along an axis, the device comprising:
a light source for producing a light flux;
a graduation support including at least one graduation placed in said light flux for modifying said light flux;
at least one light-sensitive element arranged in said support for intercepting said modified light flux,
said at least one light-sensitive element converting intensity of the intercepted light flux into a physical effect; and
a detection circuit for producing an electric signal from said physical effect, wherein:
said graduation is made of one of at least one series of optical elements and divisions, each optical element containing at least one focusing portion;
said light flux intercepts at least the entire width of an optical element of said at least one of said series and by focusing procedures at least one light spot on said support with said at least one light sensitive element therein; and the detection circuit is designed such that by a relative displacement of the graduation support in relation to the support an alternating signal, which crosses a reference value at least two times, is produced.

* * * * *